US009487055B2

(12) United States Patent
Hisada

(10) Patent No.: US 9,487,055 B2
(45) Date of Patent: Nov. 8, 2016

(54) VEHICLE THEFT ALERT SYSTEM

(71) Applicant: DENSO CORPORATION, Kariya, Aichi-pref. (JP)

(72) Inventor: Masaaki Hisada, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/655,344

(22) PCT Filed: Dec. 5, 2013

(86) PCT No.: PCT/JP2013/007141
§ 371 (c)(1),
(2) Date: Jun. 25, 2015

(87) PCT Pub. No.: WO2014/103190
PCT Pub. Date: Jul. 3, 2014

(65) Prior Publication Data
US 2015/0321640 A1 Nov. 12, 2015

(30) Foreign Application Priority Data

Dec. 27, 2012 (JP) .................................. 2012-285451
May 8, 2013 (JP) .................................. 2013-098757

(51) Int. Cl.
*B60C 23/04* (2006.01)
*B60R 25/10* (2013.01)
(Continued)

(52) U.S. Cl.
CPC .......... *B60C 23/0479* (2013.01); *B60C 23/04* (2013.01); *B60C 23/0477* (2013.01); *B60C 23/0488* (2013.01); *B60R 25/102* (2013.01); *B60R 25/1004* (2013.01); *B60R 25/34* (2013.01)

(58) Field of Classification Search
CPC ............. B60C 23/0479; B60C 23/04; B60C 23/0477; B60C 23/0488; B60R 25/1004; B60R 25/102; B60R 25/34
See application file for complete search history.

(56) References Cited

U.S. PATENT DOCUMENTS

2002/0075146 A1    6/2002    Saheki
2004/0212487 A1    10/2004   Yagi et al.
(Continued)

FOREIGN PATENT DOCUMENTS

JP    2002248914 A    9/2002
JP    2004306622 A    11/2004
(Continued)

OTHER PUBLICATIONS

International Search Report and Written Opinion (in Japanese with English Translation) for PCT/JP2013/007141, mailed Mar. 4, 2014; ISA/JP.

*Primary Examiner* — Leon Flores
(74) *Attorney, Agent, or Firm* — Harness, Dickey & Pierce, P.L.C.

(57) ABSTRACT

A vehicle theft alert system includes a lock state determination portion and a transmission control portion. The lock state determination portion determines whether doors of a vehicle have entered locked states after main power of the vehicle is turned off. The transmission control portion switches from normal mode to alarm mode when the lock state determination portion determines that the doors are locked. When a change amount of an air pressure of a tire of the vehicle is greater than a first pressure range in the alarm mode, or when a change amount of an acceleration applied to the tire is greater than a predetermined acceleration range in the alarm mode, the transmission control portion controls a mobile communication apparatus equipped to the vehicle to transmit an alarm information to an external apparatus located outside the vehicle.

6 Claims, 13 Drawing Sheets

(51) Int. Cl.
*B60R 25/34* (2013.01)
*B60R 25/102* (2013.01)

(56) References Cited

U.S. PATENT DOCUMENTS

| | | |
|---|---|---|
| 2005/0093683 A1 | 5/2005 | Wee et al. |
| 2006/0244577 A1 | 11/2006 | Tanaka et al. |
| 2009/0021363 A1* | 1/2009 | Heise ............... B60C 23/0416 340/447 |
| 2010/0141416 A1* | 6/2010 | Kukshya ............ B60C 23/0408 340/447 |
| 2012/0126967 A1* | 5/2012 | McCormick ....... B60C 23/0408 340/445 |

FOREIGN PATENT DOCUMENTS

| | | |
|---|---|---|
| JP | 2004322926 A | 11/2004 |
| JP | 2005138826 A | 6/2005 |
| JP | 2005199803 A | 7/2005 |
| JP | 2007055337 A | 3/2007 |
| JP | 2007313989 A | 12/2007 |
| JP | 4613850 B2 | 1/2011 |

\* cited by examiner

VEHICLE THEFT ALERT SYSTEM

CROSS REFERENCE TO RELATED APPLICATIONS

This application is a U.S. National Phase Application under 35 U.S.C. 371 of International Application No. PCT/JP13/007141 filed on Dec. 5, 2013 and published in Japanese as WO 2014/103190 A1 on Jul. 3, 2014. This application is based on and claims the benefit of priority from Japanese Patent Application No. 2012-285451 filed on Dec. 27, 2012 and Japanese Patent Application No. 2013-098757 filed on May 8, 2013. The entire disclosures of all of the above applications are incorporated herein by reference.

TECHNICAL FIELD

The present disclosure relates to a vehicle theft alert system.

BACKGROUND ART

Patent Literature 1 discloses an art to analyze a pattern of a change in an air pressure of a tire when the detected change in the air pressure is caused by a deflation of the tire and a rotation of the tire while an ignition (IG) of a vehicle is in the off state. In the art of Patent Literature 1, when the result of the analysis indicates that a change in the air pressure is higher than a threshold, it is determined that the change is intentionally caused by a thief of the vehicle. Further, a phone equipped to the vehicle is activated by this determination, and alerts the theft of the vehicle to a mobile phone carried by the vehicle owner via a service center.

However, a passenger such as a driver usually turns off the IG before exiting the vehicle. Therefore, a weight change due to an exit from the vehicle after the turning off of the IG, an impact due to opening and closing of the doors, and a weight change due to loading and unloading of baggage may cause the air pressure to be changed over a threshold. This air pressure change may be erroneously determined as the intentional theft of the vehicle. In such a case, the passenger may have to handle an alert activated by the erroneous determination.

PRIOR ART LITERATURES

Patent Literature

Patent Literature 1: JP 2004-306622 A

SUMMARY OF INVENTION

In view of the foregoing difficulties, in an art of detecting theft of a vehicle on the basis of an air pressure of a tire or an acceleration applied to a tire, it is an object of the present disclosure to provide a vehicle theft alert system that reduces an erroneous determination determining a change in an air pressure of the tire or a change in an acceleration applied to the tire as a change caused by a theft of the vehicle even when the change is caused by an exit of a passenger from the vehicle or the change is caused by a reason other than the theft of the vehicle.

According to an aspect of the present disclosure, a vehicle theft alert system includes a lock state determination portion and a transmission control portion. The lock state determination portion determines whether doors of a vehicle are in locked states. The doors enter the locked states after a turn-off of a main power of the vehicle. The transmission control portion switches from a normal mode to an alarm mode when the lock state determination portion determines that the doors enter the locked states. When a change amount of an air pressure of a tire of the vehicle is greater than a first pressure range in the alarm mode, or when a change amount of an acceleration applied to the tire is greater than a predetermined acceleration range in the alarm mode, the transmission control portion controls a mobile communication apparatus equipped to the vehicle to transmit an alarm information to an external apparatus located outside the vehicle.

According to the above system, in the art of detecting vehicle theft on the basis of an air pressure of a tire or an acceleration of a tire, the alarm mode is activated in response to a locking of doors as a trigger. Thus, the above-described system can reduce an erroneous determination determining a change in an air pressure of the tire or a change in an acceleration applied to the tire as a change caused by a theft of the vehicle even when the change is caused by an exit of a passenger from the vehicle or caused by reasons other than thefts.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION (First Embodiment)

Figure 1:
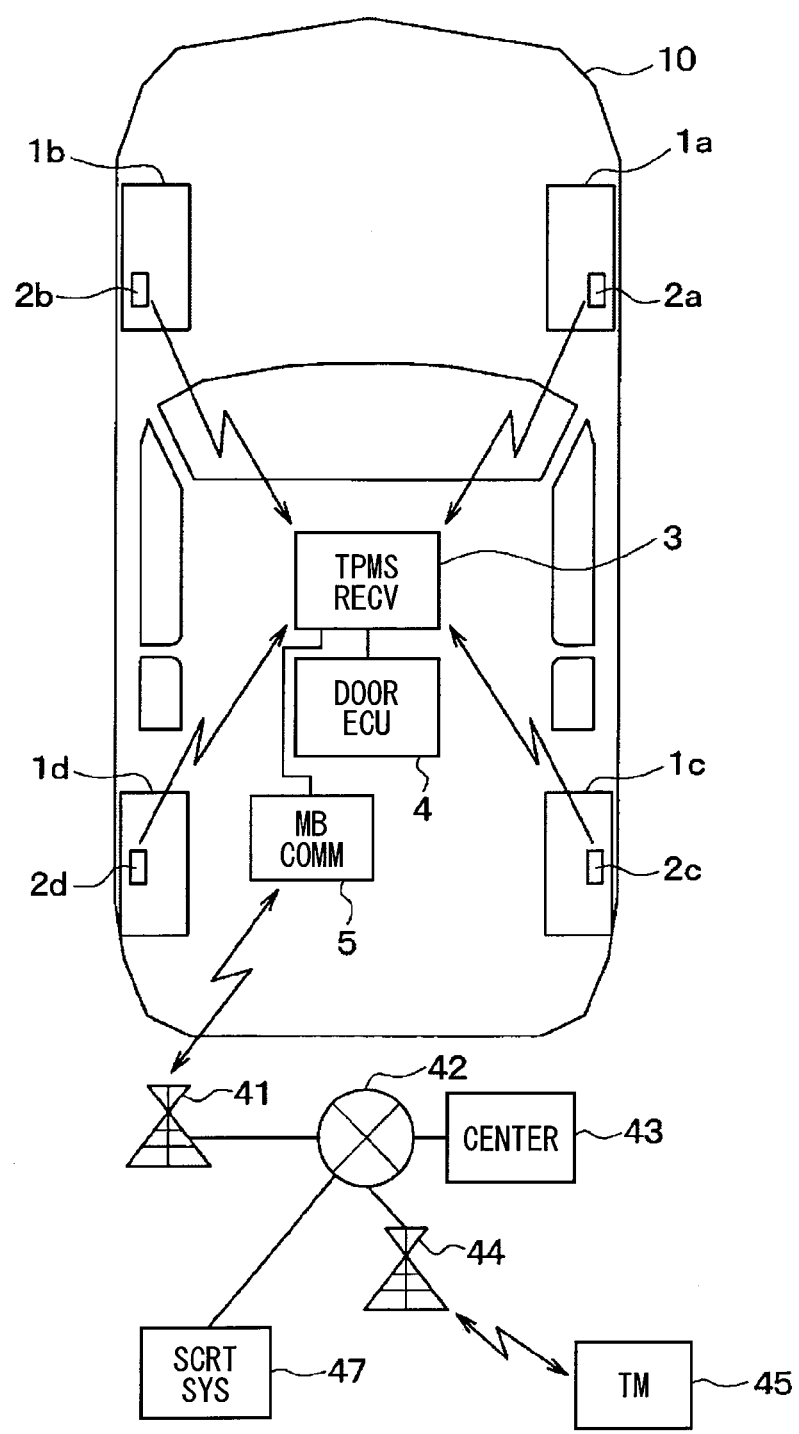
FIG. 1 is a diagram showing a configuration of a vehicle theft alert system of one embodiment of the present disclosure.

The following will describe a first embodiment of the present disclosure. As shown in FIG. 1, a vehicle theft alert system according to the present embodiment includes tire pressure monitoring system (TPMS) transmitters 2a to 2d respectively equipped to multiple tires 1a to 1d of a vehicle 10 that travels using an internal combustion engine, a TPMS receiver (TPMS RECV) 3 equipped to a body of the vehicle 10, a door-lock electronic control unit (DOOR ECU) 4, and a mobile communication apparatus (MB COMM) 5.

The TPMS transmitters 2a to 2d are always in an operating state regardless of on state or off state of an IG of the vehicle (equivalent to an example of on state or off state of a main power of the vehicle) and a locking state of doors. That is, the transmitters are always in the operating state during the on state of the IG, during a period from a turn-off of the IG to locking of the doors, and after the locking of the doors.

During the operating state, each of the TPMS transmitters 2a to 2d detects an air pressure and acceleration applied to each of the tires 1a to 1d (for example, acceleration applied in a radial direction of the tire). The transmitters 2a to 2d are, respectively, attached to corresponding tires of the vehicle. The acceleration is applied to each tire due to vibration or rotation of the tire. Each TPMS transmitter 2a to 2d transmits a latest detection value (air pressure and acceleration) in wireless manner.

Figure 2:
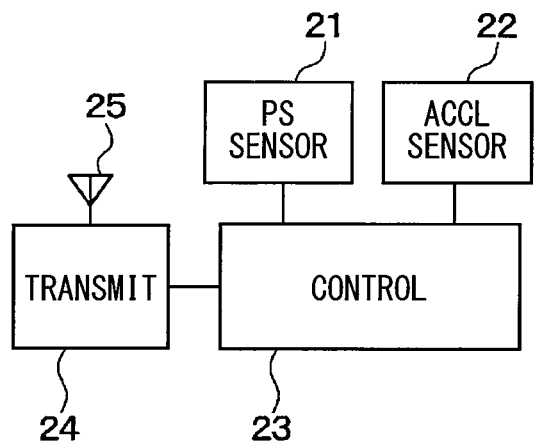
FIG. 2 is a diagram showing a configuration of a tire pressure monitoring system (TPMS) transmitter.

More specifically, as shown in FIG. 2, each of the TPMS transmitters 2a to 2d includes a pneumatic sensor (PS SENSOR) 21, an acceleration sensor (ACCL SENSOR) 22, a control portion (CONTROL) 23, a transmission portion (TRANSMIT) 24, and a transmission antenna 25. In each TPMS transmitter, the components 21 to 25 are supplied with electric power by a battery, which is not shown. The battery is equipped to the corresponding TPMS transmitter.

The pneumatic sensor 21 includes, for example, a diaphragm pressure sensor and outputs detection signals on the basis of an air pressure of the tire to which the pneumatic sensor is attached.

The acceleration sensor 22 detects an acceleration applied to the corresponding tire. The corresponding tire is a tire to which the acceleration sensor 22 is attached to. The acceleration is applied to the tire due to a vibration or a rotation of the tire. For example, the acceleration sensor 22 outputs a detection signal indicating a radial acceleration applied to the tire during a rotation of the wheel.

The control portion 23 is provided by a microcomputer including a CPU, a memory and the like. The control portion 23 performs predetermined processes in accordance with programs stored in the memory. Specifically, the control portion 23 periodically and repeatedly acquires a tire pressure on the basis of the detection signal outputted from the pneumatic sensor 21. Further, the control portion 23 repeatedly and periodically acquires information related to an acceleration based on the detection signal outputted from the acceleration sensor 22. Then, the control portion 23 stores both the information related to the tire pressure and the information related to the acceleration in one frame, and controls the transmission portion 24 to transmit the frames at predetermined intervals to the TPMS receiver 3 via the transmission antenna 25.

Specifically, the control portion 23 determines whether the tire pressure has been changed based on the detection signal from the pneumatic sensor 21. Further, the control portion 23 determines whether the acceleration of the tire has been changed based on the detection signal from the acceleration sensor 22.

When the control portion 23 determines that at least one of the tire pressure or the acceleration has been changed, the control portion 23 outputs the frame including the latest tire pressure or the latest acceleration to the transmission portion 24. When the control portion 23 determines that neither tire pressure nor acceleration has been changed, the control portion 23 controls the transmission portion 24 to cancel transmitting.

The transmission portion 24 is provided by a wireless transmitting circuit, which amplifies and modulates the frame to be transmitted and transmits the amplified and modulated frame via the transmission antenna 25. As described above, the control portion 23 controls the transmission portion 24 to transmit no frame when there is no change in the tire pressure or in the acceleration. Therefore, the power consumption of the built-in batteries of the TPMS transmitters can be restricted and the operation period of alerting a theft of the vehicle can be lengthened compared with a case in which the frame is transmitted each time in response to an acquirement of the tire pressure and the acceleration.

Since the tire pressure and the acceleration continuously change during a travel of the vehicle 10 due to the vibrations generated by the travelling, a power consumption of the transmission portion 24 cannot be substantially reduced. However, during a stationary state of the vehicle (for example, during parking), since the tire pressure and acceleration do not change in most cases, the power consumption of the transmission portion 24 can be substantially reduced.

Figure 3:
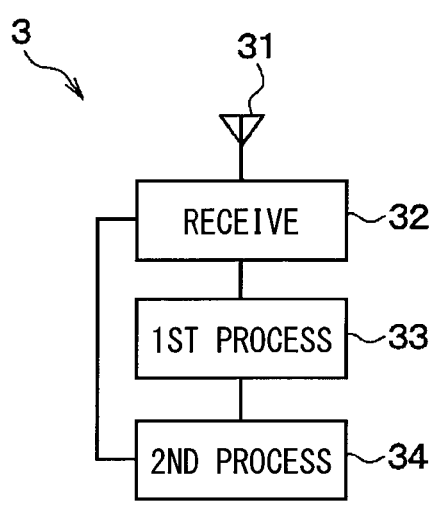
FIG. 3 is a diagram showing a configuration of a TPMS receiver.

The TPMS receiver 3 receives the frames transmitted from the TPMS transmitters 2a to 2d as mentioned above, and controls the display based on the information included in the received frames (for example, display of the air pressure on a meter). As shown in FIG. 3, the TPMS receiver 3 includes a reception antenna 31, a reception portion (RECEIVE) 32, a first processing portion (1ST PROCESS) 33, and a second processing portion (2ND PROCESS) 34.

The reception portion 32 demodulates and amplifies the signals received by the antenna 31 (namely, signals of the frames transmitted from the TPMS transmitters 2a to 2d). Then, the reception portion 32 outputs the demodulated and amplified data (frames) to the first processing portion 33 and the second processing portion 34.

The reception portion 32 is always in an operating state and receives signals including the frames transmitted from the TPMS transmitters 2a to 2d. That is, during the on state of the IG, during a period from the turn-off of the IG to the locking of the doors, and after the locking of the doors followed by the turn-off of the IG, the reception portion 32 is in the operating state.

Each of the first processing portion 33 and the second processing portion 34 includes a well-known microcomputer having a CPU, a memory and the like. The first processing portion 33 is always in an operating state. That is, during the on state of the IG, during a period from the turn-off of the IG to the locking of the doors, and after the locking of the doors followed by the turn-off of the IG, the first processing portion 33 is in the operating state. The second processing portion 34 is set to be in an active state during the on state of the IG and during the period from the turn-off of the IG to the locking of the doors. However, in other periods, for example, after the locking of the doors followed by the turn-off of the IG, the second processing portion 34 enters a sleep state (in sleep state, power consumption is lower than the active state, and the sleep state is also referred to as a low power consumption state).

A power consumption of the first processing portion 33 in the operating state is much lower than the power consumption of the second processing portion 34 in the active state. The first processing portion 33 is inferior to the second processing portion 34 in processing capability because of the lower power consumption in the active state. For example, the first processing portion 33 is unable to transmit signals directly to a mobile communication apparatus 5 for controlling the mobile communication apparatus 5, but the second processing portion 34 is able to transmit signals directly to the mobile communication apparatus 5 and control the mobile communication apparatus 5. The first processing portion 33 is unable to control a display of the tire pressures and accelerations, but the second processing portion 34 is able to control the display of the tire pressures and accelerations.

A door lock ECU 4 is provided by a well-known controller that controls locking and unlocking of the doors of the vehicle 10. The door lock ECU 4 outputs a door lock signal to the second processing portion 34 of The TPMS receiver 3 in order to lock the doors. The door lock ECU 4 outputs a door unlock signal to the second processing portion 34 in order to unlock the doors. The door lock ECU 4 is always in an operating state during the on state of the IG, a period from the turn-off of the IG to the locking of the doors, and after the locking of the doors followed by the turn-off of the IG.

The mobile communication apparatus 5 is a wireless communication portion and communicates with a communication destination positioned outside of the vehicle 10. The mobile communication apparatus 5 is always in an active state during the on state of the IG. When the IG is in the off state, the mobile communication apparatus 5 enters a sleep state, which consumes low power than the active state.

Thus, the mobile communication apparatus 5 is switched between the active state and the sleep state. In the active state, the mobile communication apparatus 5 is able to communicate with a communication destination positioned outside of the vehicle. The active state requires high power consumption. In the sleep state, the mobile communication apparatus 5 is unable to communicate with the communication destination positioned outside of the vehicle. The sleep state requires lower power consumption than the active state. The sleep state of the mobile communication apparatus 5 is also referred to as a low power consumption state.

The mobile communication apparatus 5 operating in the active state wirelessly communicates with a wireless base station 41 connected to a communication network 42 (mobile communications network, internet or the like) to communicate with a service center (CENTER) 43 (equivalent to an example of a destination apparatus) connected to the communication network 42. The service center 43 communicates with a user terminal 35 (a terminal carried by a user of the vehicle 10) via the communication network 42 and a base station 44. The service center 43 communicates with a security system (SCRT SYS) 47 via the communication network 42. The security system 47 is a communication apparatus owned and managed by a security company or the police.

Figure 4:
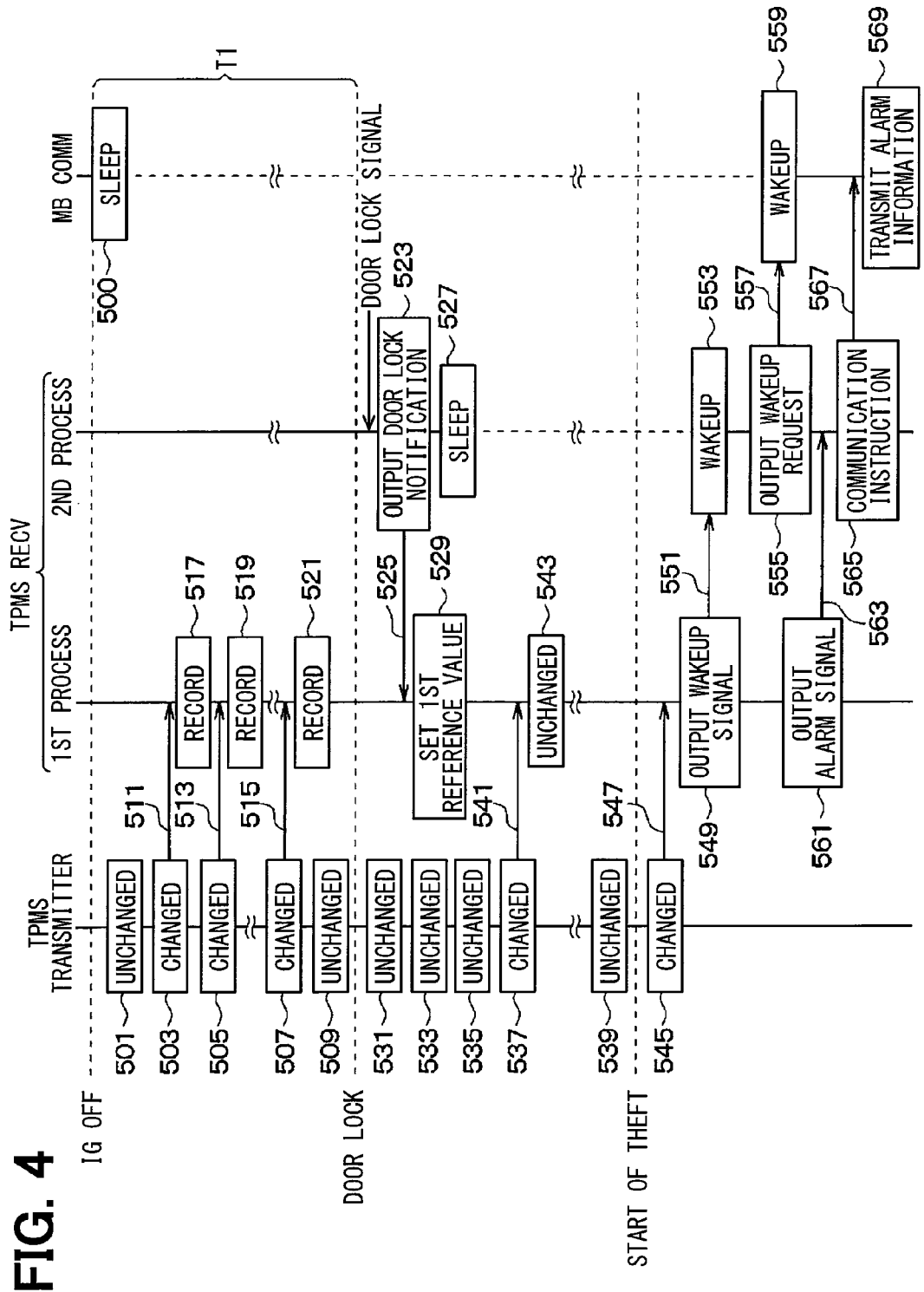
FIG. 4 is a sequence diagram showing an operation of the vehicle theft alert system.
Figure 5:
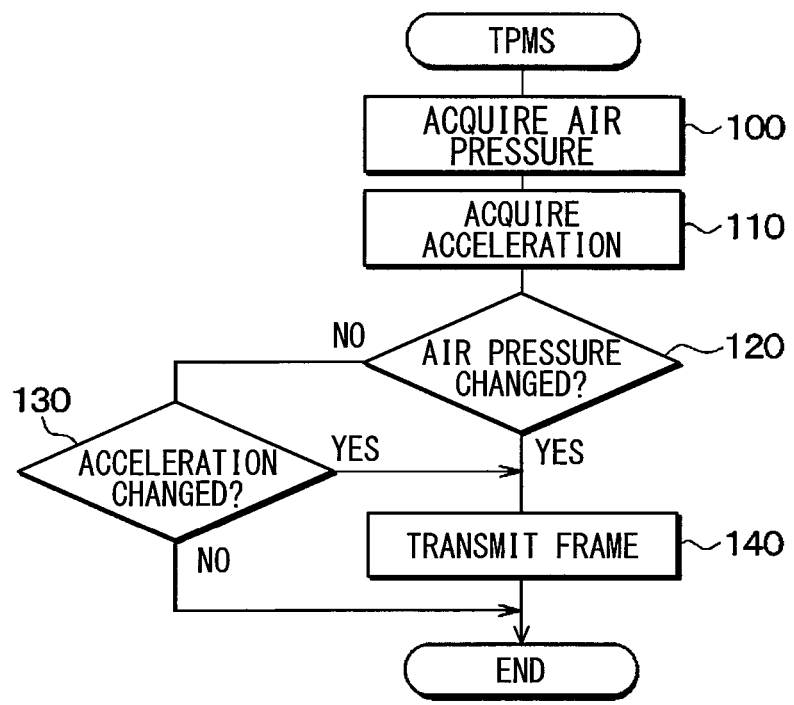
FIG. 5 is a flowchart of a process executed by a control portion of the TPMS transmitter.
Figure 6:
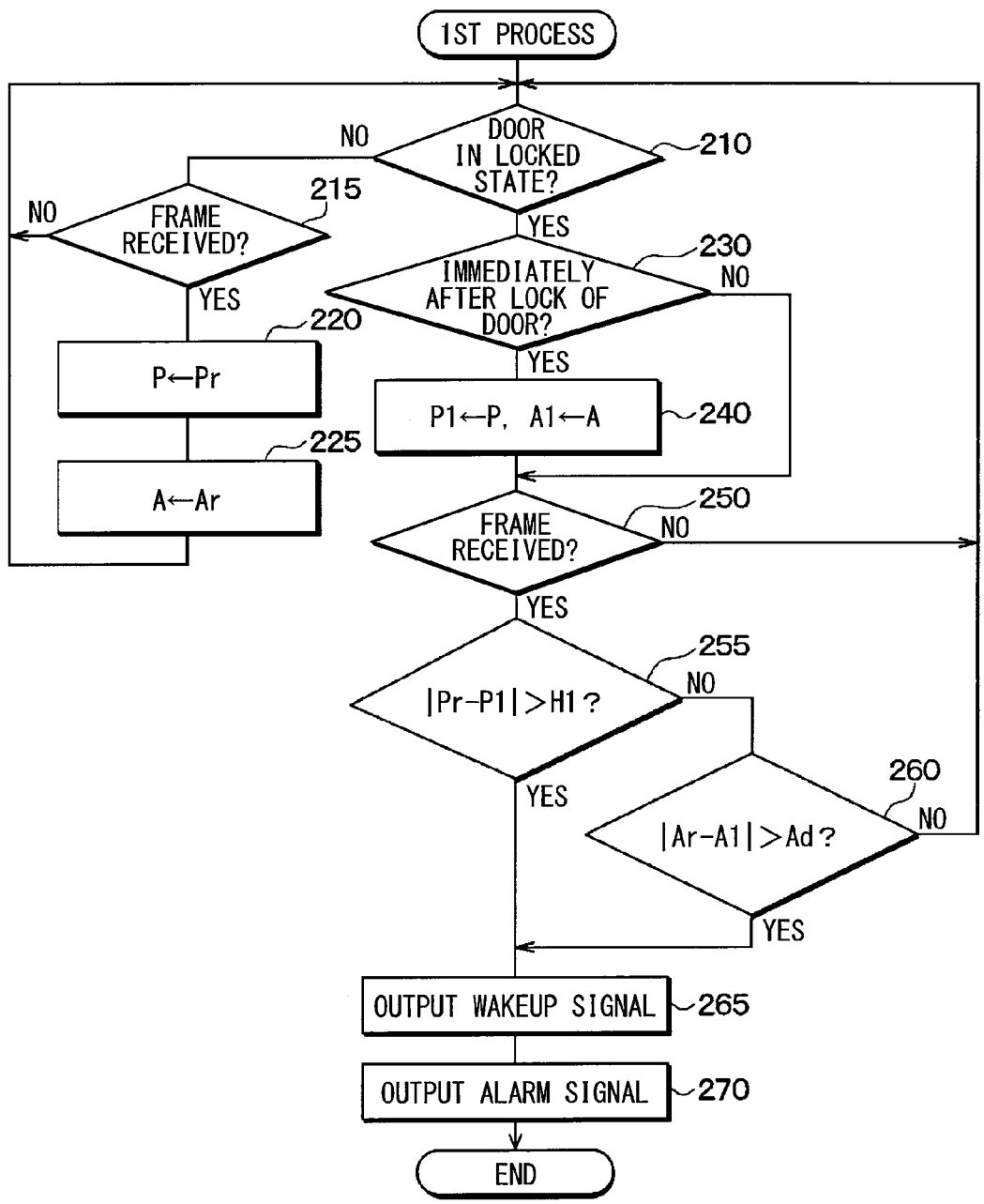
FIG. 6 is a flowchart of a process executed by a first processing portion of the TPMS receiver according to a first embodiment.

The following will describe operation of the vehicle theft alert system having the above-described configuration with reference to FIG. 4 to FIG. 6. In FIG. 4, only one of the TPMS transmitters 2a to 2d is illustrated as an example for easy explanation, but other TPMS transmitters are fundamentally the same when performing the operation. First, suppose that the IG of the vehicle 10 is turned off from the on state.

Before the turn-off of the IG of the vehicle 10 (namely, during the on state of the IG), the entirety of the TPMS transmitters 2a to 2d (including the portions 21 to 25), the entirety of the TPMS receiver 3 (including the portions 31 to 34), the entirety of the door lock ECU 4, and the entirety of the mobile communication apparatus 5 work in the normal state.

During the on state of the IG, the control portion 23 of each TPMS transmitters 2a to 2d determines whether at least one of the tire pressure or the acceleration has been changed, and controls the transmission portion 24 to transmit the frame including the latest tire pressure and acceleration when determining that the change has been occurred. The transmission portion 24 is controlled to transmit no frame when the control portion 23 determines that neither tire pressure nor acceleration has been changed.

More specifically, the control portion 23 of each TPMS transmitters 2a to 2d executes the process shown in FIG. 5 repeatedly and periodically. In each execution of the process shown in FIG. 5, the control portion 23 first acquires a latest tire pressure at step 100 on the basis of a detection signal outputted from the pneumatic sensor 21. Then, at step 110, the control portion 23 acquires a latest acceleration on the basis of a detection signal outputted from the acceleration sensor 22.

Then, at step 120, the control portion 23 compares the latest tire pressure acquired at step 100 with a first previous tire pressure (or a second or more previous tire pressure, the same applies to the following) acquired at step 100 in the first previous execution of the process shown in FIG. 5 (or a second or more previous execution of the process, the same applies to the following) to determine whether the tire pressure has been changed compared with the tire pressure acquired in the past.

Specifically, the control portion 23 compares the latest tire pressure (for example, an 8-bit integral value) with the first previous tire pressure (for example, an 8-bit integral value), and determines that the tire pressure has been changed even when there exists only a small difference (one significant lowest bit of the tire pressure) between the tire pressures. Then, the control portion 23 proceeds to step 140. When the tire pressures are completely the same with one another, the control portion 23 determines that there is no change in the tire pressure, and proceeds to step 130.

At step 130, the control portion 23 compares the latest acceleration acquired at latest step 110 with a first previous acceleration (or a second or more previous acceleration, the same applies to the following) acquired at step 110 in the first previous execution of the process shown in FIG. 5 (or the second or more previous execution of the process, the same applies to the following) to determine whether the acceleration has been changed. Specifically, the control portion 23 compares the latest acceleration (integral value) with the first previous acceleration (integral value), and determines that the acceleration has been changed even when there exists only a small difference (one significant lowest bit of the acceleration) between the accelerations. Then, the control portion proceeds to step 140. However, when the accelerations are completely the same with one another, the control portion 23 determines that the acceleration has not been changed and ends the process shown in FIG. 5 without executing step 140 (namely, without transmitting any frame).

At step 140, the control portion 23 controls the transmission portion 24 to transmit the frame including a transmitter ID of the host transmitter, the latest tire pressure, and the latest acceleration. Then, the control portion 23 ends the process shown in FIG. 5. The transmitter ID is preset to be different in each of the TPMS transmitters 2a to 2d from one another.

During the on state of the IG, the air pressure or acceleration of each tire changes in most cases. The change is caused by the vibration of the tire or the rotation of the tire. The vibration of the tire may be caused by the operation of the vehicle engine or a change of the road surface condition during the traveling.

In the control portion 23 of each TPMS transmitter 2a to 2d, transmission of the frame based on the determination that at least one of the air pressure or acceleration has been changed is more frequent than transmission of no frame based on the determination that neither air pressure nor acceleration has been changed.

The first processing portion 33 of the TPMS receiver 3 detects whether the IG is turned to on state via a not-shown IG line in a wait state. On reception of the above frame via the reception antenna 31 and reception portion 32, the second processing portion 34 displays, on a meter of the vehicle 10, information based on one or both of the air pressure and acceleration of the tire.

Then, when the IG is turned off, among TPMS transmitters 2a to 2d, TPMS receiver 3, door lock ECU 4, and mobile communication apparatus 5, the mobile communication apparatus 5 detects the turn-off of the IG via a not-shown IG line. In response to the detection of the turn-off of the IG, the mobile communication apparatus 5 enters the sleep state in which lower power is consumed than the normal state (step 500). However, the TPMS transmitters 2a to 2d, TPMS receiver 3, and door lock ECU 4 keep working in the normal state even after the IG is turned off.

Even after the turn-off of the IG as well as before the turn-off of the IG, each control portion 23 of the TPMS transmitters 2a to 2d repeats the process shown in FIG. 5 periodically. During a period T1 from the turn-off of the IG to the locking of the doors of the vehicle 10, passengers (a driver or other passengers) of the vehicle 10 exit from the vehicle 10, unload baggage from the vehicle 10 by opening and closing the doors (actions for the exit). Accordingly, the load of the vehicle body and the accelerations of the tires are likely to be changed largely during this period. Therefore, during the period T1, the air pressure and acceleration of each tire change frequently.

As shown in the sequence diagram of FIG. 4, in each control portion 23 of the TPMS transmitters 2a to 2d, transmission of frames 511, 513, and 515 (for example, steps 503, 505, and 507) based on the determination that at least one of the air pressure or acceleration has been changed (CHANGED) is more frequent than transmission of no frame based on the determination that the air pressure and acceleration remain unchanged (UNCHANGED) (for example, steps 501 and 509).

The first processing portion 33 of the TPMS receiver 3 receives the frames 511, 513, and 515 via the reception antenna 31 and reception portion 32. When the first processing portion 33 determines that the IG is turned off using a not-shown IG line, the first processing portion 33 starts the process shown in FIG. 6 immediately after the turning off of the IG.

In the process shown in FIG. 6, the first processing portion 33 first determines at step 210 whether the vehicle enters the door-locked state (namely, the state in which the doors are locked) on the basis of a signal outputted from the door lock ECU 4. When the first processing portion determines that the doors are not locked yet (no door lock signal has been received), the first processing portion 33 determines that the doors have not been locked, and proceeds to step 215.

At step 215, the first processing portion 33 determines whether the frame has been received from any one of the TPMS transmitters 2a to 2d, and returns to step 210 when no frame has been received. That is, when no frame is received during a period from the turn-off of the IG to the lock of the doors, the first processing portion 33 repeats the processes of steps 210 and 215.

During the repeated execution of steps 210 and 215, suppose that the first processing portion 33 receives the frame (for example, the frames 511, 513, and 515) transmitted from any one of the TPMS transmitters 2a to 2d via the reception antenna 31 and reception portion 32. Then, at step 215, the first processing portion 33 determines that the frame has been received and proceeds to step 220.

At step 220, the first processing portion 33 reads out a tire pressure Pr from the frame received at step 215, displays a value of the readout tire pressure (referred to as a received pressure Pr) on a meter of the vehicle, and assigns the value to a current pressure P, which is a variable parameter. There are multiple current pressures P, each of which is a reference value corresponding to each of the TPMS transmitters 2a to 2d. As described above, each TPMS transmitter has a specific transmitter ID. That is, the current pressure P to which the tire pressure Pr included in the received frame is assigned corresponds to the transmitter ID included in the received frame. Accordingly, when the number of the tires equipped to the vehicle 10 is equal to four, four current pressures P are provided for respective tires.

At step 225, the first processing portion 33 reads out an acceleration Ar from the frame received at step 215, displays a value of the readout acceleration (referred to as a received acceleration) on the meter, and assigns the value to a current acceleration A, which is a variable parameter. There are multiple current accelerations A, each of which is a reference value corresponding to each of the TPMS transmitters 2a to 2d. As described above, each TPMS transmitter has a specific transmitter ID. That is, the current acceleration A to which the acceleration Ar included in the received frame is assigned corresponds to the transmitter ID included in the received frame.

During the period T1 from the turn-off of the IG to the lock of the doors, each time one of the frames 511, 513, and 515 is received, the current pressure P and current acceleration A are overwritten by the air pressure and acceleration included in the latest received frame (refer to steps 517, 519, 521), as shown in FIG. 4.

When the passengers exits from the vehicle by closing the doors and no one being in the vehicle, the doors are locked by the door lock ECU 4. Then, the door lock ECU 4 outputs a door lock signal to the second processing portion 34 of the TPMS receiver 3.

On reception of the door lock signal, the second processing portion 34 immediately outputs a signal of a door lock notification 525 to the first processing portion 33 (step 523), and immediately after that, switches from the active state to the sleep state (step 527). Thus, power consumption of the second processing portion 34 becomes lower than before the locking of the doors, and maintains the lower power consumption.

On reception of the door lock notification 525 during the repeated execution of the steps 210 and 215 or during the repeated execution of the steps 210, 215, 220, and 225, the first processing portion 33 determines at immediately subsequent step 210 that the doors have been locked, and proceeds to step 230. Thus, the first processing portion 33 switches from the normal mode to alarm mode. Even after the switch to the alarm mode, the doors are determined to be in the locked state at step 210 until the doors are opened and the door unlock notification is received from the second processing portion 34.

At step 230, the first processing portion 33 determines whether the current time is immediately after the lock of the doors. When the first processing portion 33 determines at latest step 210 that the doors have been locked and also determined at step 210 of one previous execution of the process that the doors was not locked, the first processing portion 33 determines that the current time is immediately after the lock of the doors. In other cases, the first processing portion 33 determines that the current time is not immediately after the lock of the doors.

In the present example, step 230 is immediately after lock of the doors. Thus, the first processing portion 33 determines that the current time is immediately after the lock of doors, and proceeds to step 240. At step 240, the first processing portion 33 sets reference values. Specifically, the first processing portion 33 sets the current pressure P of each tire $1a$ to $1d$ as a first pressure reference value P1 of each tire, and sets the current acceleration A of each tire $1a$ to $1d$ as an acceleration reference value A1 of each tire (refer to step 529).

Therefore, there are multiple first pressure reference values P1 and acceleration reference values A1, which respectively correspond to the TPMS transmitters $2a$ to $2d$ each having a specific transmitter ID.

The first pressure reference value P1 and acceleration reference value A1 are respectively the latest pressure and the latest acceleration that are received before the doors are locked. The values before the door are locked are used as the first pressure reference value P1 and acceleration reference value A1 because the air pressures and accelerations of the tires maintain nearly unchanged after the doors are locked. Thus, after the doors are locked, it may be difficult to receive the pressures and accelerations from the TPMS transmitters $2a$ to $2d$ for a long time. In a case where the values after the lock of doors (for example, first reception values after the doors are locked) are used as the first pressure reference value P1 and acceleration reference value A1, settings of the first pressure reference value P1 and acceleration reference value A1 may be substantially delayed. Each set reference value is recorded in a not-shown memory included in the TPMS receiver 3.

The first pressure reference value P1 and acceleration reference value A1 of each tire are compared with the pressure and acceleration received later from the TPMS transmitter of the same tire to determine an occurrence of vehicle theft (including mischief made to the vehicle hereinafter).

At step 250, similar to step 215, the first processing portion 33 determines whether the frame has been received from any one of the TPMS transmitters $2a$ to $2d$, and when no frame has been received, returns to step 210. Then, when no frame is received after the IG is turned off and the doors are locked, the first processing portion 33 determines that the current time is not immediately after the lock of the doors at step 210, and determines that the present step is not immediately after the doors have been locked at step 230, determines that no frame has been received at step 250, and returns to step 210. Therefore, the first processing portion 33 repeats the processes of steps 210, 230, and 250 in the described order.

The mobile communication apparatus 5 is still in the sleep state even after the doors have been locked. After the doors have been locked, the TPMS transmitters $2a$ to $2d$ operate using the same algorithm as before the doors are locked. However, in most cases, the air pressures of the tires $1a$ to $1d$ and the accelerations of the tires $1a$ to $1d$ do not change after the doors have been locked.

The air pressures and accelerations may change in some cases. For example, the tire pressure may decrease occasionally (for example, about once a day) by one bit of the lowest significant bit due to slow leak that causes the tire pressure to decrease gradually. In other cases, the air pressures and accelerations of the tires may slightly change due to external factors such as a cat or strong wind that are not related to theft (hereinafter including mischief made to the vehicle). As will be described below, the air pressures of the tire and accelerations applied to the tires may change largely due to theft of the vehicle.

In most cases, the control portion 23 determines that the air pressures are unchanged at step 120 of FIG. 5 and the accelerations are unchanged at step 130. Therefore, the frames are prohibited from being transmitted as shown in steps 531, 533, 535, and 539 of FIG. 4. Thus, compared with the case where the frames are transmitted periodically, the TPMS transmitters $2a$ to $2d$ can achieve more reduction in power consumption.

Suppose that one of the TPMS transmitters $1a$ to $1d$ detects a slight change of the air pressure or acceleration caused by an external factor such as a cat or strong wind, which is not related to theft. Then, the control portion 23 of the TPMS transmitter determines that there is a change at step 120 or step 130 of FIG. 5, and proceeds to step 140. The control portion 23 controls the transmission portion 24 to transmit the frame 541 including the transmitter ID of the host transmitter, a latest tire pressure, and a latest acceleration at step 140 (refer to step 537). Thereby, the frame 541 is transmitted to the TPMS receiver 3 from the TPMS transmitter.

During repeated execution of the processes of steps 210, 230, and 250, when receiving the frame 541 via the antenna 31 and reception portion 32, the first processing portion 33 determines that the frame has been received at immediately subsequent step 250, and proceeds to step 255.

At step 255, the first processing portion 33 reads out the first pressure reference value P1 corresponding to the transmitter ID included in the received frame 541, from the memory. The first processing portion 33 calculates an absolute value of a difference between the readout first pressure reference value P1 and the pressure Pr included in the received frame 541, and determines whether this absolute value is higher than a predetermined first pressure range H1.

The first pressure range H1 is a reference value for selecting and detecting a pressure change generated by a vehicle theft. Therefore, the first pressure range H1 is further higher than a minimum range of pressure change (specifically, a change of one bit of the lowest significant digit) by which the control portion 23 of the TPMS transmitter determines that there is a change at step 120.

When a pressure in one of the tires changes due to an external factor such as a cat or strong wind that is not related to the vehicle theft, an absolute value of a difference between the pressure Pr after the change and the first pressure reference value P1 is not higher than the first pressure range H1 as a result of the change. In this case, at step 255, the first processing portion 33 determines that an absolute value of a difference between the first pressure reference value P1 and the pressure included in the received frame 541 is not higher than the first pressure range H1, and proceeds to step 260.

At step 260, the first processing portion 33 reads out the acceleration reference value A1 corresponding to the transmitter ID included in the received frame 541, from the memory. The first processing portion 33 calculates an absolute value of a difference between the readout acceleration reference value A1 and the acceleration Ar included in the received frame 541 to determine whether the absolute value is higher than a predetermined acceleration range Ad.

The predetermined acceleration range Ad is a reference value for selecting and detecting an acceleration change generated by the vehicle theft. The acceleration range Ad is set to be greater than a minimum amount of acceleration change (specifically, one bit of the lowest significant digit) by which the control portion 23 of the TPMS transmitter determines that there is a change at step 130.

When an acceleration of one tire changes due to an external factor such as a cat or strong wind that is not related to the vehicle theft, an absolute value of a difference between the acceleration Ar and acceleration reference value A1 is not higher than the acceleration range Ad as a result of the change. In this case, the first processing portion 33 determines that the absolute value of the difference between the acceleration Ar and acceleration reference value A1 is not higher than the acceleration range Ad at step 260, and returns to step 210. As a result, the first processing portion 33 does not output a wakeup signal corresponding to the frame 541 (refer to step 543), which will be described later The first processing portion 33 repeats processes of steps 210, 230, and 250 until the doors are unlocked or the frame is received again.

Then, suppose that a thief starts the vehicle theft. As a result, the pressures of the tires change largely due to the impact caused by a pry of the door, and the accelerations of the tires increase largely by rotation of the tires. Alternatively, the tire pressures largely increase when a person enters the vehicle, and the tire pressures largely decrease by towing or jacking the vehicle.

Then, the control portion 23 of any one of the TPMS transmitters 2a to 2d determines that there is a change at step 120 or step 130 of FIG. 5, and proceeds to step 140. Then, at step 140, the control portion 23 controls the transmission portion 24 to transmit the frame 547, which includes the transmitter ID of the host transmitter, the latest tire pressure Pr, and the latest acceleration Ar (refer to step 545). The frame 547 is transmitted to the TPMS receiver 3 from the TPMS transmitter.

Then, the first processing portion 33 receives the frame 547 via the antenna 31 and reception portion 32 during repeated execution of the processes of steps 210, 230, and 250. The first processing portion 33 determines that the frame has been received at immediately subsequent step 250, and proceeds to step 255.

At step 255, the first processing portion 33 reads out the first pressure reference value P1 corresponding to the transmitter ID included in the received frame 547, from the memory. The first processing portion 33 calculates an absolute value of a difference between the readout first pressure reference value P1 and the pressure Pr included in the received frame 547, determines that the absolute value is higher than the first pressure range H1, and proceeds to step 265.

When the first processing portion 33 determines that the absolute value is not higher than the first pressure range H1, the first processing portion 33 proceeds to step 260. However, also in this case, at step 260, the first processing portion 33 calculates an absolute value of a difference between the acceleration reference value A1 corresponding to the transmitter ID and the acceleration Ar included in the frame 547, and determines that the absolute value is higher than the acceleration range Ad. Then, the process proceeds to step 265.

At step 265, the first processing portion 33 outputs a predetermined wakeup signal (WKP SGN) 551 to the second processing portion 34 (refer to step 549). The second processing portion 34 wakes up on reception of the wakeup signal 551 (step 553). That is, the second processing portion 34 switches from the sleep state to active state.

After woken up, the second processing portion 34 outputs a predetermined wakeup request (WKP REQ) 557 to the mobile communication apparatus 5 immediately (step 555). The mobile communication apparatus 5 wakes up on reception of the wakeup request 557 (step 559). That is, the mobile communication apparatus 5 switches from the sleep state to active state on reception of the wakeup request 557. In the active state, the mobile communication apparatus consumes higher power than in the sleep state, and is able to communicate with communication destinations positioned outside of the vehicle (for example, the service center 43) different from the sleep state.

After outputting the wakeup signal 551 at step 265, the first processing portion 33 outputs a predetermined alarm signal (ALM SGN) 563 to the second processing portion 34 at step 270 (step 561), and then ends the process shown in FIG. 6. On reception of the alarm signal 563, the second processing portion 34 outputs a predetermined communication instruction 567 to the mobile communication apparatus 5 to report theft of the vehicle (step 565).

The mobile communication apparatus 5 performs communications on reception of the communication instruction 567 (step 569). Specifically, the mobile communication apparatus 5 is wirelessly connected to the wireless base station 41, which is connected to the communication network 42 (mobile communications network, internet or the like). Then, the mobile communication apparatus 5 transmits alarm information (ALM INFO) indicating that theft may have occurred to the service center 43 (equivalent to an example of the destination apparatus), which is connected to the communication network 42 via the wireless connection.

The alarm information includes a mobile communication apparatus ID to identify the mobile communication apparatus 5 from other devices. The mobile communication apparatus ID of the mobile communication apparatus 5 is previously registered in the service center 43. In a database of the service center 43, the mobile communication apparatus ID corresponds to an address of a user terminal (TM) 45 carried by an owner of the vehicle that is equipped with the mobile communication apparatus 5. An address of the service center 43 is previously registered in the mobile communication apparatus 5.

On reception of the alarm information from the mobile communication apparatus 5, the service center 43 automatically transmits query information to the user terminal 45 (for example, a mobile phone) of the owner of the vehicle via the communication network 42 and wireless base station 44. The query information includes information indicating that vehicle theft may have occurred and information that queries whether a transmission of dispatch request to the security system 47 is necessary. An address of the user terminal 45 can be acquired by extracting, from the above database, an address of the user terminal associated with the mobile communication apparatus ID included in the alarm information received from the mobile communication apparatus 5.

At the same time, on reception of the alarm information from the mobile communication apparatus 5, the service center 43 automatically transmits, via the communication network 42 and wireless base station 47, a wait request to inform the security system 47 whose address has been previously registered to be in a waiting state in preparation for the vehicle theft. The wait request includes the mobile communication apparatus ID obtained from the received alarm information.

After receiving the wait request, the security system 47 displays the received wait request. An operator (a security company or the police) at the security system 47 who has seen this display can be get prepared for dispatch to perform the dispatch rapidly.

The user terminal 45 that has received the query information displays the query information to the user (owner of the vehicle), and receives a reply from the user about the necessity of the transmission of the dispatch request to the security system 47.

When the user manipulates the user terminal 45 to reply that the transmission of the dispatch is necessary, the user terminal 45 transmits the dispatch request to the service center 43. The service center 43 receives the dispatch request as the reply to the query information. On reception of the dispatch request, the service center 43 transmits the dispatch request to the security system 47. In this case, the mobile communication apparatus ID included in the alarm information received from the mobile communication apparatus 5 is included in the dispatch request.

The security system 47 that has received the dispatch request displays this dispatch request. When an operator (the security company or the police) at the security system 47 sees the display of the dispatch request, the operator can rapidly dispatch the service men who are already ready for the dispatch (for action against theft).

When the user manipulates the user terminal 45 to reply that the user does not transmit the dispatch request, the user terminal 45 transmits a wait cancel request to the service center 43. The service center 43 receives the wait cancel request as the reply to the query information. On reception of the wait cancel request, the service center 43 transmits the wait cancel request to the security system 47. The mobile communication apparatus ID included in the alarm information received from the mobile communication apparatus 5 is included in this wait cancel request.

The security system 47 that has received the wait cancel request displays the wait cancel request. When the operator (the security company or the police) at the security system 47 sees the display, the operator cancels the wait state for the dispatch.

The operator at the security system 47 deals with the vehicle theft in response to the reply from the vehicle owner. Thus, unnecessary dispatch is avoided when the vehicle is used by participants including family members.

When the owner of the vehicle enters the vehicle again, the doors of the vehicle are unlocked by a portable key or mechanical key. At this time, after unlocking the doors, the door lock ECU 4 outputs a door unlock signal to the second processing portion 34 of the TPMS receiver 3. On reception of the door unlock signal, the second processing portion 34 wakes up from the sleep state, and enters the active state. Then, the second processing portion 34 outputs a door unlock notification to the first processing portion 33.

In the alarm mode, when receiving the door unlock notification during the repeated execution of the processes of steps 210, 230, and 250 in described order, the first processing portion 33 determines at step 210, which is immediately after the reception of the door unlock notification, that the doors are not in the locked state, and proceeds to step 215. With this process, the first processing portion 33 switches from the alarm mode to normal mode, and returns to executions of the processes of steps 210 to 225. Hereinafter, the first processing portion 33 determines at step 210 that the doors are in the unlocked state until the first processing portion 33 receives the door lock notification.

As explained above, the vehicle theft alert system of the present embodiment determines whether the doors of the vehicle 10 have been locked after the turn-off of the IG of the vehicle 10 (equivalent to one example of the turn-off of the main power) (step 210). On the basis of a determination that the doors turns to locked, namely on the basis of a change of the determination result at step 210 from "the state in which the doors are in the unlocked state" to "the state in which the doors are in the locked state," the vehicle theft alert system switches to the alarm mode (from step 210 to step 230). In the alarm mode, when the amount of change in each air pressure of the tires 1a to 1d relative to the first pressure reference value P1 is greater than the first pressure range H1, the alarm information is transmitted to the external apparatuses (the service center 43, user terminal 45, and security system 47) positioned outside of the vehicle 10. In this case, the external apparatuses are transmission destinations of the alarm information. When the amount of change in each acceleration of the tires 1a to 1d of the vehicle relative to the first acceleration A1 is greater than the acceleration range Ad, the alarm information is transmitted to the external apparatuses (the service center 43, user terminal 45, and security system 47) positioned out of the vehicle 10.

For example, in the conventional art, the switch to the alarm mode is made immediately after the turn-off of the IG. In this case, the switch to the alarm mode is made before the passenger (owner of the vehicle) of the vehicle exits from the vehicle. In such a case, normal behaviors such as entering and exiting the vehicle, changes in weight caused by the passenger's exiting from the vehicle, impacts generated when the doors are opened or closed, and changes in weight when baggage is loaded or unloaded, may be determined to be theft behavior erroneously. The owner of the vehicle may need to repeatedly handle the notifications made based on incorrect determinations and received via the user terminal 45.

The first pressure range H1 and acceleration range Ad may be set to prevent usual movement and weight change from being determined to be caused by the vehicle theft (first pressure range H1 and acceleration range Ad are set so that changes are determined to be not higher than the first pressure range H1 or acceleration range Ad at steps 255 and 260). However, pry of a lock, door opening and closing, and entrance of a suspicious person occurred in case of theft of a vehicle are not particularly different from usual entrance to the vehicle in operation and impact. Therefore, with this configuration, it may be difficult to detect occurrence of vehicle theft.

The present embodiment, by starting the alarm mode when the doors are locked, can prevent normal exit from the vehicle and loading and unloading of baggage from being erroneously detected as vehicle theft, and can reduce useless notifications to the user. That is, the configuration of the present embodiment can reduce the possibility of the incorrect determination resulting from the exit operation made by passengers.

In the alarm mode while the vehicle is being parked, the TPMS transmitters 2a to 2d, the reception portion 32 of the TPMS receiver 3, and the first processing portion 33 of the TPMS receiver 3 are constantly in operation states. Thus, in the alarm mode, the power consumption of the second processing portion 34 of the TPMS receiver 3 and the mobile communication apparatus 5 can be reduced. As a result, the possibility that theft detection becomes disabled caused by a depletion of the vehicle battery can be restricted even during long-term parking.

When theft is detected (when a determination of YES is made at step 255 or step 260), the first processing portion 33 can wake up and activate the second processing portion 34 and the mobile communication apparatus 5 successively only by outputting the wakeup signal to the second processing portion 34. This configuration can reduce the processing load of the first processing portion 33, which has a low processing capacity because of low power consumption.

(Second Embodiment)

The following will describe a second embodiment of the present disclosure. According to the present embodiment, a handling of slow leak is added to the first embodiment. The slow leak is a phenomenon in which a tire pressure decreases gradually during normal usage of tires.

The following will describe a problem caused by slow leak using the case in which the vehicle is parked for a long period of time (for example, several months) as an example. In this case, during the parking, the air pressures of the tires decrease gradually, and when each air pressure decreases to some level or lower than the level, the first processing portion 33 of the TPMS receiver 3 determines at step 255 of FIG. 6 that an absolute value of a difference between the first pressure reference value P1 and received pressure Pr is higher than the first pressure range H1. As a result, the alarm information is transmitted to the service center 43, and the query information is transmitted to the user terminal 45 from the service center 43. Accordingly, the owner of the vehicle receives the notification about the possibility of vehicle theft and needs to handle the situation although the vehicle theft has not been occurred. In this case, a wait request is also transmitted to the security system 47 although there is no vehicle theft.

In the present embodiment, additional function is added to handle such a problem. Hereafter, the present embodiment focuses on different parts from the first embodiment. First, a hardware configuration of the vehicle theft alert system of the present embodiment is the similar to the first embodiment.

Figure 7:
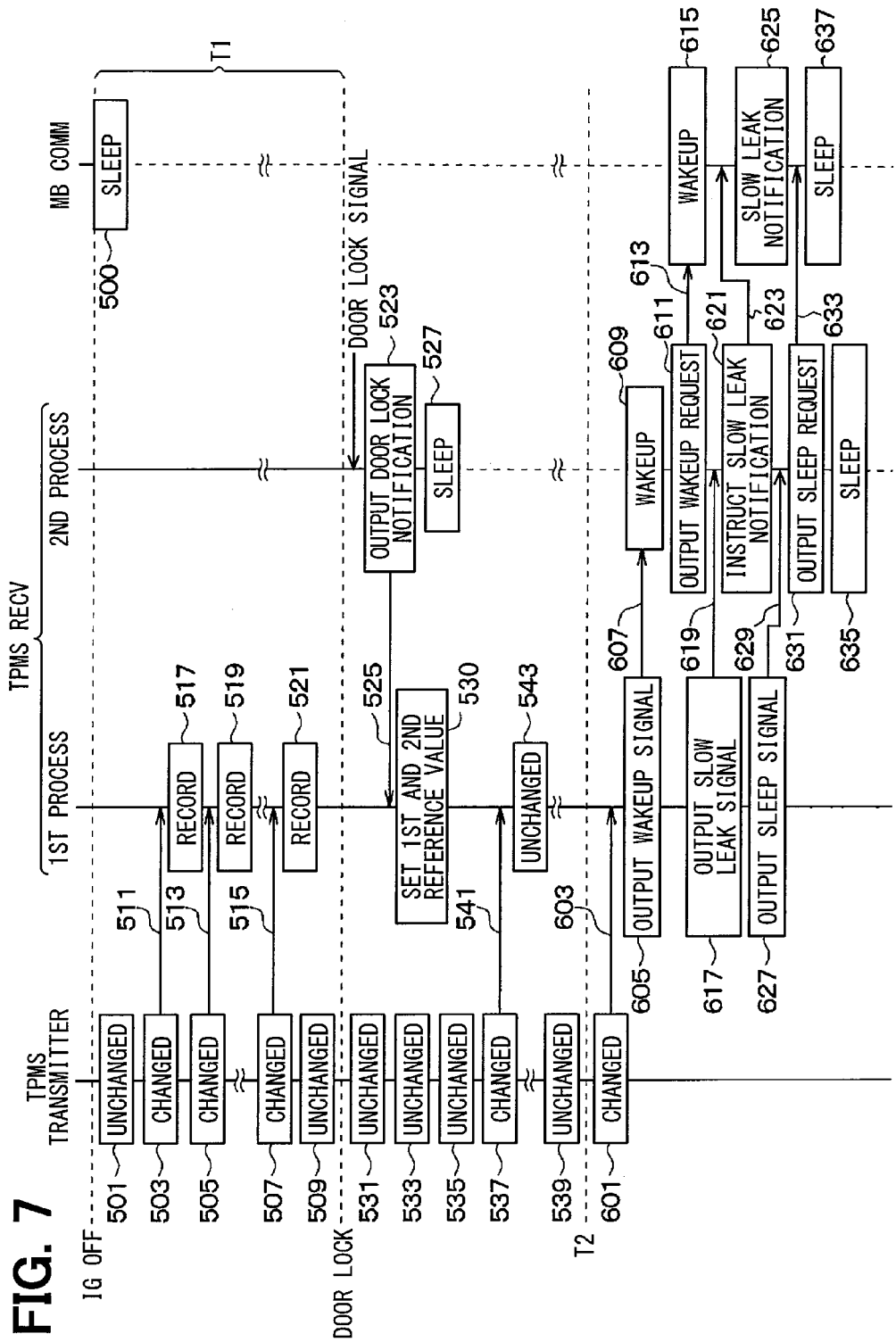
FIG. 7 is a sequence diagram showing an operation of the vehicle theft alert system according to a second embodiment.

Operation and functions of the TPMS transmitters 2a to 2d, door lock ECU 4, user terminal 45, and security system 47 of the present embodiment are similar to the first embodiment. Operation of the vehicle theft alert system in the present embodiment are shown in a sequence diagram in FIG. 6. In FIG. 7, steps having the same reference numerals with FIG. 4 execute similar operation. The signals having the same reference numerals are similar signals, and not explained in detail hereinafter.

Figure 8:
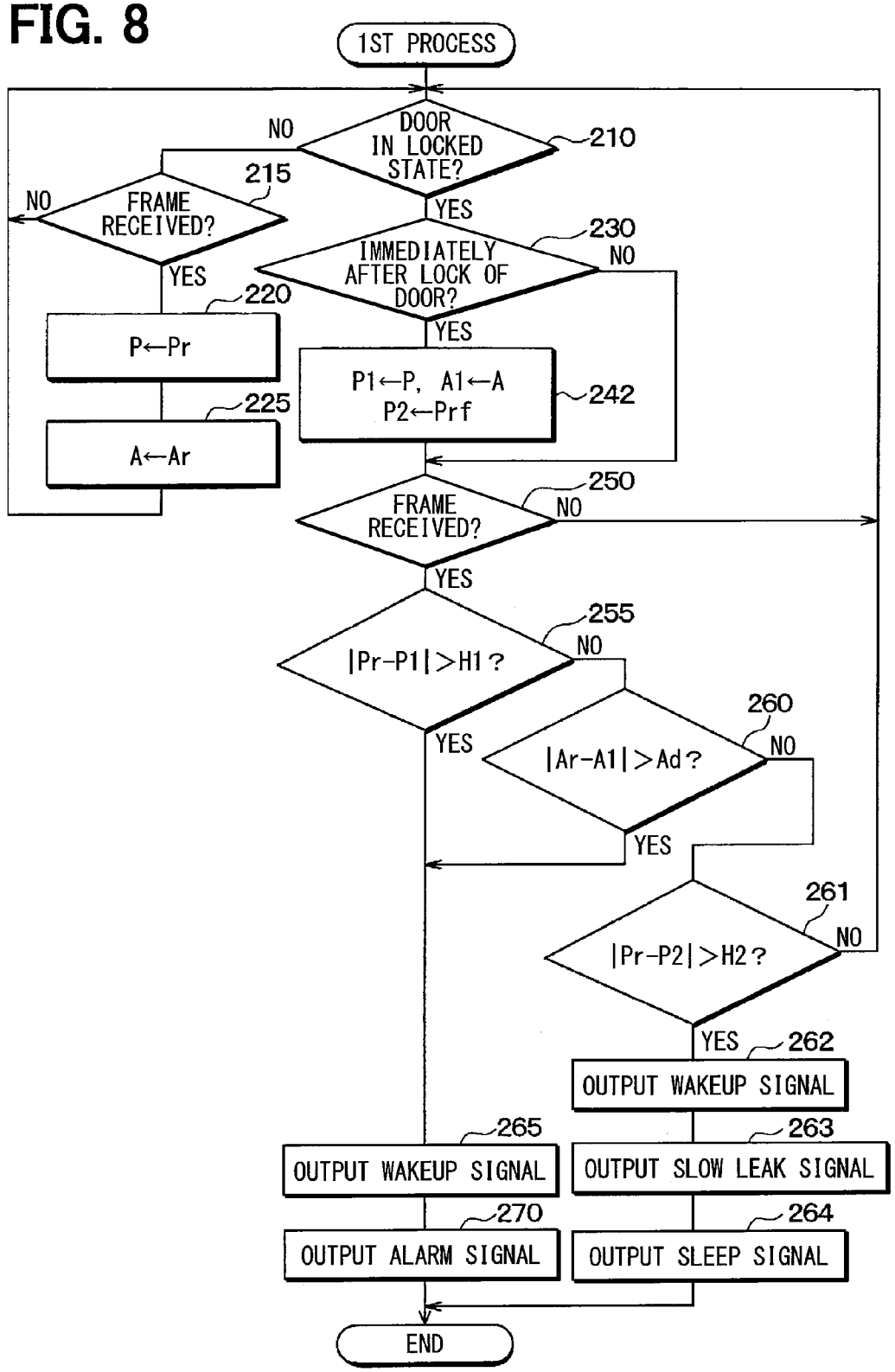
FIG. 8 is a flowchart of a process executed by the first processing portion of the TPMS receiver according to the second embodiment.

When the IG is turned off, the first processing portion 33 of the TPMS receiver 3 in the present embodiment starts the process shown in FIG. 8 immediately after the turn-off of the IG instead of the process shown in FIG. 6. In FIG. 8, steps having the same reference numerals with FIG. 6 execute similar operations. Hereinafter, detailed explanation of the processes is omitted.

Before the IG of the vehicle 10 is turned off (namely, during the on state of the IG), operation of the vehicle theft alert system during a period T1 from the turn-off of the IG to the lock of doors are similar to the first embodiment.

When the passengers exit from the vehicle, the doors are closed with nobody remaining in the vehicle, and the doors are locked. In this case, the door lock ECU 4 outputs the door lock signal to the second processing portion 34, similar to the first embodiment. The second processing portion 34 that has received the door lock signal outputs the door lock notification 525 to the first processing portion 33 immediately (step 523), and immediately after that, switches from the active state to sleep state (step 527).

Similar to the first embodiment, on reception of the above door lock notification 525, the first processing portion 33 determines that the doors have been locked at immediately subsequent step 210, and proceeds to step 230 to switch to the alarm mode. Additionally, similar to first embodiment, after the switch to the alarm mode, the first processing portion 33 determines at step 210 that the doors are in the locked state until the doors are opened by the user and the first processing portion 33 receives a door unlock notification from the second processing portion 34.

In the present embodiment, suppose that current time at step 230 is immediately after the lock of doors. Thus, the first processing portion 33 determines that the current time is immediately after the lock of doors, and proceeds to step 242. At step 242, the first processing portion 33 sets the reference values. In the first embodiment, the first pressure reference value P1 and acceleration reference value A1 are set at step 240 of FIG. 6. At step 242 of the present embodiment, the first processing portion 33 additionally sets a predetermined second pressure reference value P2 (step 530 of FIG. 7).

The specific method of setting the first pressure reference value P1 and acceleration reference value A1 is similar to step 240 of FIG. 6. As a setting method for the second pressure reference value P2, a reference pressure Prf corresponding to a current pressure of each of the tires 1a to 1d is set as the second pressure reference value P2 for each tire. Therefore, there are multiple second pressure reference values P2, each of which is a reference value corresponding to each of the TPMS transmitters 2a to 2d each having a specific transmitter ID.

The second pressure reference value P2 is also set on the basis of a latest reception pressure value Pr before the doors are locked. The reason for setting the second pressure reference value P2 on the basis of the latest reception pressure value Pr is similar to the reason for setting the first pressure reference value P1 on the basis of the latest reception value Pr before the lock of doors. Each of the second pressure reference values P2 is stored in a not-shown memory included in the TPMS receiver 3.

Here, the reference pressure Prf corresponding to each tire may also be equal to the current pressure P of the corresponding tire. Alternatively, detection values of the air pressures of the tires may be recorded four times per day during the past one week. An average of the recorded air pressures during one week may be set as the reference pressure Prf. In this case, the second pressure reference value P2 is higher than the first pressure reference value P1, which is set to equal to the latest pressure value of the tire. Thus, the second pressure reference value P2 may be set equal to the first pressure reference value P1 or may be set higher than the first pressure reference value P1.

The second pressure reference value P2 of each corresponding tire is a reference value that is to be compared with the latest air pressure and the latest acceleration received from the TPMS transmitter of the corresponding tire to determine the occurrence of slow leak.

After step 242, at step 250, the first processing portion 33 determines whether the frame has been received from any one of the TPMS transmitters 2a to 2d, and when not received, returns to step 210 similar to step 215 of the first embodiment. Similar to the first embodiment, during a period after the IG is turned off and the doors are locked, the first processing portion 33 repeats the processes of steps 210, 230, and 250 in described order, under a condition that no frame is received.

The mobile communication apparatus 5 is still in the sleep state even after the doors are locked. Even after the doors are locked, each of the TPMS transmitters 2a to 2d works using the same algorithm as before the doors are locked. Therefore, in most cases, the control portion 23 determines that the air pressure has not changed at step 120 of FIG. 5 and the acceleration has not changed at step 130. Therefore, as shown in steps 531, 533, 535, and 539 of FIG. 7, transmission of the frame is prohibited.

Here, one of the TPMS transmitters 1a to 1d detects a slight change in the air pressure or in the acceleration, which is caused by an external factor not related to theft such as a cat or strong wind. Then, the control portion 23 of the TPMS transmitter performs operation similar to the first embodiment to control the transmission portion 24 to transmit the frame 541 (refer to step 537).

Then, similar to the first embodiment, the first processing portion 33 also determines at step 250 that the frame 541 has been received, and proceeds to step 255.

At step 255, when the first processing portion 33 determines that an absolute value of a difference between the first pressure reference value P1 corresponding to the transmitter ID included in the frame 541 and the pressure Pr included in the received frame 541 is not higher than the first pressure range H1, the first processing portion 33 proceeds to step 260. At step 260, the first processing portion 33 determines whether an absolute value of a difference between the acceleration reference value A1 corresponding to the transmitter ID included in the received frame 541 and the acceleration Ar included in the received frame 541 is higher than the acceleration range Ad. The processes of steps 255 and 260 are similar to the steps in the first embodiment.

At step 260, when the first processing portion 33 determines that the absolute value of the difference is not higher than the acceleration range Ad, the first processing portion 33 proceeds to step 261 instead of immediately returning to step 210.

At step 261, the first processing portion 33 reads out the second pressure reference value P2 corresponding to the transmitter ID included in the received frame 541, from the memory. The first processing portion 33 calculates an absolute value of a difference between the readout second pressure reference value P2 and the pressure Pr included in the received frame 541, and determines whether the absolute value of the difference is higher than a second pressure range H2. In other words, the first processing portion 33 determines whether the pressure Pr included in the received frame 541 is equal to or higher than a pressure Z2a, which is lower than the second pressure reference value P2 by the second pressure range H2 (the second pressure reference value P2 minus the second pressure range H2), and is equal to or lower than a pressure Z2b, which is higher than the second pressure reference value P2 by the second pressure range H2 (the second pressure reference value P2 plus the second pressure range H2).

The second pressure range H2 is a reference value for selecting a large decrease of the air pressure caused by slow leak after the lock of doors. This configuration can avoid an erroneous determination of the vehicle theft caused by the slow leak. Therefore, as shown in FIG. 9, the second pressure range H2 is previously set lower than the first pressure range H1 used to detect theft.

Figure 9:
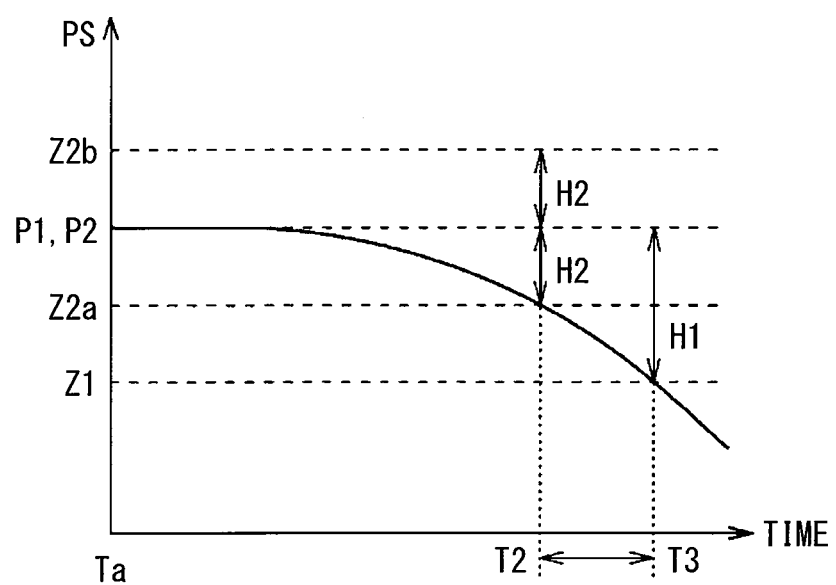
FIG. 9 shows a graph showing a change of a tire pressure during a long period of parking.

FIG. 9 is a graph showing a change of the air pressure (PS) of each tire 1a to 1b from a time point Ta with an elapse of a time (TIME) after the doors are locked subsequently to the turn-off of the IG. In FIG. 9, the air pressure decreases over time due to slow leak. In this example, the current time point is much before a time point T2 at which the tire pressure decreases from the second pressure reference value P2 by over the second pressure range H2. The time point T2 is, for example, a time point when a month has elapsed after the lock of doors and the turn-off of the IG.

Simultaneously, the second pressure range H2 is much greater than a minimum pressure change amount (specifically, a change of lowest significant bit of the pressure value) based on which the control portion 23 of the TPMS transmitter determines at step 210 that the pressure has been changed.

When an influence of slow leak is not still large and the pressure of one of the tires has been changed due to an external factor not related to theft such as a cat, an absolute value of a difference between the pressure Pr after the change and the second pressure reference value P2 is not higher than the second pressure range H2. Therefore, in this case, the first processing portion 33 determines at step 261 that the pressure has not changed largely, and returns to step 210. As a result, the first processing portion 33 does not output the wakeup signal in response to the frame 541 (refer to step 543).

Then, the first processing portion 33 repeats the processes of steps 210, 230, and 250 until an unlocking of doors or until a receiving of the frame. Then, the operation of the vehicle theft alert system when a thief starts theft of the vehicle before the time point T2 is similar to the operation after the time point of the start of the theft in FIG. 4 of the first embodiment.

FIG. 9 shows a case in which the second pressure reference value P2 is equal to the first pressure reference value P1. As described above, the second pressure reference value P2 may be higher than the first pressure reference value P1. Also in this case, the second pressure range H2 is previously set to be lower than the first pressure range H1. This purpose is to set the value Z2a higher than a value Z1. The value Z1 is obtained by subtracting the first pressure range H1 from the first pressure reference value P1. The value Z2a is equal to a value obtained by subtracting the second pressure range H2 from the second pressure reference value P2. The value Z1 is also referred to as a theft determination threshold, and the values Z2a and Z2b are also referred to as slow leak thresholds.

Suppose that the time point T2 is reached after the vehicle is parked and the doors are locked. At the time point T2, due to slow leak, in one of the tires 1a to 1d, the air pressure may be decreased from the second pressure reference value P2 by over the second pressure range H2, namely, the air pressure may be decreased to be lower than the slow leak threshold Z2a.

The control portion 23 of the corresponding TPMS transmitter of the TPMS transmitters 2a to 2d determines that there has been a change at step 120 or step 130 of FIG. 5, and proceeds to step 140. At step 140, the control portion 23 controls the transmission portion 24 to transmit a frame 603 including the transmitter ID of the host transmitter, a latest tire pressure, and a latest acceleration (refer to step 601). The TPMS receiver 3 receives the frame 603 from the TPMS transmitter.

During repeated execution of the steps 210, 230, and 250, when the first processing portion 33 receives the frame 603 via the antenna 31 and reception portion 32, the first processing portion 33 determines that the frame has been received at immediately subsequent step 250, and proceeds to step 255.

At step 255, the first processing portion 33 determines whether an absolute value of a difference between the first pressure reference value P1 corresponding to the transmitter ID included in the frame 603 and the pressure Pr included in the received frame 603 is higher than the first pressure range H1. As shown in FIG. 9, since the absolute value is lower than the pressure range H1 at the time point T2, the first processing portion 33 determines that the absolute value is not higher than the first pressure range H1, and proceeds to step 260.

At step 260, the first processing portion 33 determines whether an absolute value of a difference between the acceleration reference value A1 corresponding to the transmitter ID included in the received frame 603 and the acceleration Ar included in received frame 603 is higher than the acceleration range Ad. Suppose a case that no theft occurs to the vehicle. In this case, the acceleration has no substantial change. Therefore, the first processing portion 33 determines that the absolute value of the difference is not higher than the acceleration range Ad, and proceeds to step 261.

At step 261, the first processing portion 33 reads out the second pressure reference value P2 corresponding to the transmitter ID included in the received frame 603, from the memory. The first processing portion 33 calculates an absolute value of a difference between the read second pressure reference value P2 and the pressure Pr included in the received frame 603, and determines whether the absolute value is higher than the second pressure range H2.

Here, suppose that the received air pressure Pr decreases from the second pressure reference value P2 by the second pressure range H2 or more. In this case, the first processing portion 33 determines that the absolute value is higher than the second pressure range H2, and proceeds to step 262.

At step 262, the first processing portion 33 outputs a predetermined wakeup signal 607 to the second processing portion 34 (refer to step 605). The second processing portion 34 wakes up on reception of the wakeup signal 607 (step 609). That is, the second processing portion 34 switches from the sleep state to the active state.

After woken up, the second processing portion 34 outputs a predetermined wakeup request 613 to the mobile communication apparatus 5 immediately (step 611). The mobile communication apparatus 5 wakes up on reception of the wakeup request 613 (step 615). That is, the mobile communication apparatus 5 switches from the sleep state to the active state. Different from the sleep state, in the active state, the mobile communication apparatus 5 consumes more power than the sleep state and is able to communicate with the external apparatuses (for example, the service center 43) positioned out of the vehicle 10.

After outputting the wakeup signal 607 at step 262, the first processing portion 33 outputs a predetermined slow leak signal (S-LEAK SGN) 619 to the second processing portion 34 at step 263 (step 617). On reception of the slow leak signal 619, the second processing portion 34 outputs a predetermined slow leak notification instruction (S-LEAK NOTI) 623 to the mobile communication apparatus 5 to report a great decrease of the air pressure (step 621).

The mobile communication apparatus 5 performs the slow leak notification on reception of the slow leak notification 623 (step 625). Specifically, the mobile communication apparatus 5 wirelessly connects to the wireless base station 41, which is connected to the communication networks 42 (the mobile communications network, the internet or the like). Then, via the wireless connection, slow leak information indicating the great decrease of the air pressure caused by the slow leak is transmitted to the service center 43 (equivalent to one example of the transmission destination apparatuses) connected to the communication network 42. The slow leak information includes a mobile communication apparatus ID for identifying the mobile communication apparatus 5.

On reception of the slow leak information from the mobile communication apparatus 5, an apparatus at the service center 43 automatically transmits the slow leak notification indicating the great decrease of the air pressure caused by slow leak to the user terminal 45 (for example, mobile phone) of the owner of the vehicle via the communication network 42 and the wireless base station 44. The service center 43 does not transmit, to the security system 47, the wait request described in the first embodiment or the information related to the notification of the great decrease of the air pressure caused by the slow leak.

The user terminal 45 that has received the slow leak notification displays the slow leak notification to the user (the owner of the vehicle). The user who confirms the display related to the slow leak is able to know the great decrease of the air pressure caused by the slow leak. Then, for example, the user can pump up the tires of the vehicle in the future.

After step 263, the first processing portion 33 waits until an elapse of a predetermined wait period (for example, one minute). Herein, the wait period may be set to a period in which the mobile communication apparatus 5 is able to complete transmission of the slow leak notification. After the wait time elapses, the first processing portion 33 proceeds to step 264 and outputs a predetermined sleep signal 629 to the second processing portion 34 (step 627). After step 264, the first processing portion 33 ends the process shown in FIG. 8.

On reception of the sleep signal 629, the second processing portion 34 outputs a predetermined sleep request 633 to the mobile communication apparatus 5 (step 631). Then, the second processing portion 34 switches from the active state to the sleep state (step 635).

The mobile communication apparatus 5 that has already completed transmission of the slow leak notification switches from the active state to the sleep state on reception of the sleep request 633 (step 637).

As shown in FIG. 9, the air pressure further decreases caused by the slow leak also after the time point T2, and the air pressure decreases from the pressure reference value P1 by the first pressure range H1 or more at the time point T3. In this case, since the first processing portion 33 does not perform the process shown in FIG. 8 any longer, the alarm information is not transmitted from the mobile communication apparatus 5 to the service center 43. Therefore, the owner of the vehicle and the security system 47 are not frequently warned about the decrease of the air pressure because the pressure change is caused by the slow leak but not the vehicle theft.

(Third Embodiment)

Figure 10:
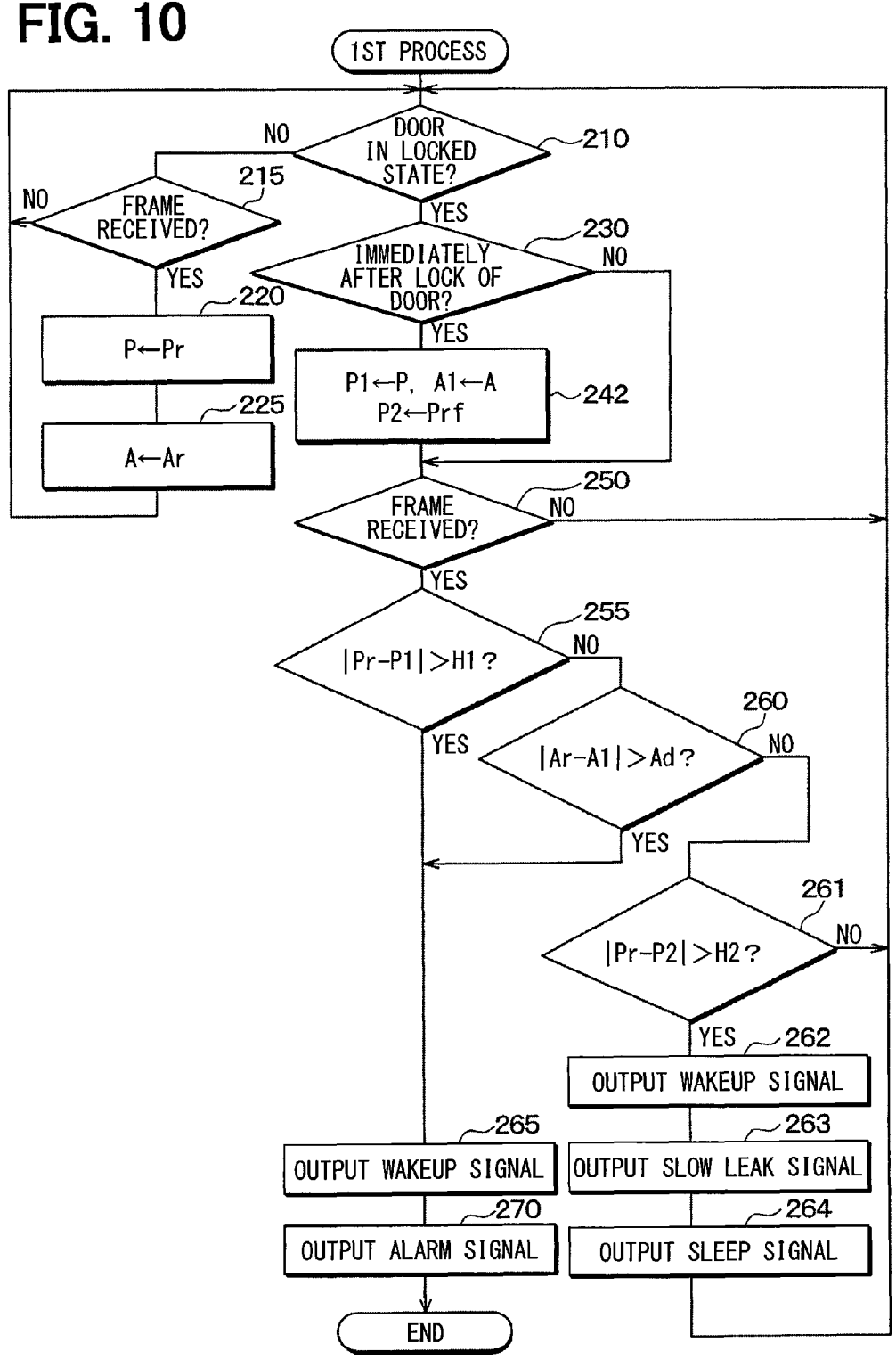
FIG. 10 is a flowchart of a process executed by the first processing portion of the TPMS receiver according to a third embodiment.

The following will describe a third embodiment of the present disclosure. The present embodiment differs from the second embodiment only in that the process shown in FIG. 8 performed by the first processing portion 33 is replaced with the process shown in FIG. 10. The process shown in FIG. 8 differs from the process shown in FIG. 10 in that the process shown in FIG. 8 ends after step 264 as shown in FIG. 8 but the process shown in FIG. 10 returns to step 210 after step 264 as shown in FIG. 10. Thus, in the present embodiment, even after outputting the slow leak signal to control the mobile communication apparatus 5 to perform the slow leak notification, theft is continuously detectable on the basis of the tire pressures and accelerations of the tires.

(Fourth Embodiment)

The following will describe a fourth embodiment of the present disclosure focusing on a difference from the second embodiment. According to the second embodiment, the slow leak threshold Z2a is higher than a theft determination threshold Z1. For this reason, at an initial stage of the occurrence of the vehicle theft, depending on time point at which a changing of the tire pressure is detected, a result of the detected value (pressure included in the frame received by the first processing portion 33) of the air pressure of a certain tire may appear as the continuous line in the graph of FIG. 11. In this case, when an improper behavior (theft, mischief) starts at a time point T4, a detection value of an air pressure of a certain tire is decreases lower than the slow leak threshold Z2a immediately after a time point T5, which is followed by the time point T4. Further, after the time point T5, the detection value of the air pressure of the tire further decreases lower than the theft determination threshold Z1 immediately after a time point T6, which is a time point a certain duration TD1 (for example, any duration from several seconds to several minutes) has elapsed from the time point T5.

In this case, from the time point T4 to the time point T5, the first processing portion 33 of the second embodiment makes a negative determination (NO determination) at each of steps 255, 260, and 261 of FIG. 8 each time the first processing portion 33 receives the frame from the TPMS transmitter equipped to the tire.

Immediately after the time point T5, when the detection value of the air pressure of the tire is lower than the slow leak threshold Z2a, a negative determination is made at step 255, 260, but a positive determination (YES determination) is made at step 261. That is, an erroneous determination that slow leak has occurred is made, and then, the steps 262, 263, and 264 are carried out.

Thus, although in a case of the vehicle theft occurrence, the pressure change or the acceleration change may be determined to be the slow leak. Then, the process shown in FIG. 8 is ended. With this configuration, it is difficult to output the alarm signal to the user. That is, the alarming to the user is canceled. As a result, an expected countermeasure against the vehicle theft may be cancelled.

In above-described case, after the erroneous determination that slow leak has occurred, it is possible to detect theft on the basis of the acceleration of the tire through the configuration shown in an after-mentioning first modification. However, in this case, it is difficult to handle the vehicle theft by towing the vehicle using a wrecker truck or the like. In other words, this configuration is not effective to the vehicle theft in which only a tire pressure changes with an acceleration of a tire being maintained unchanged.

Figure 12:
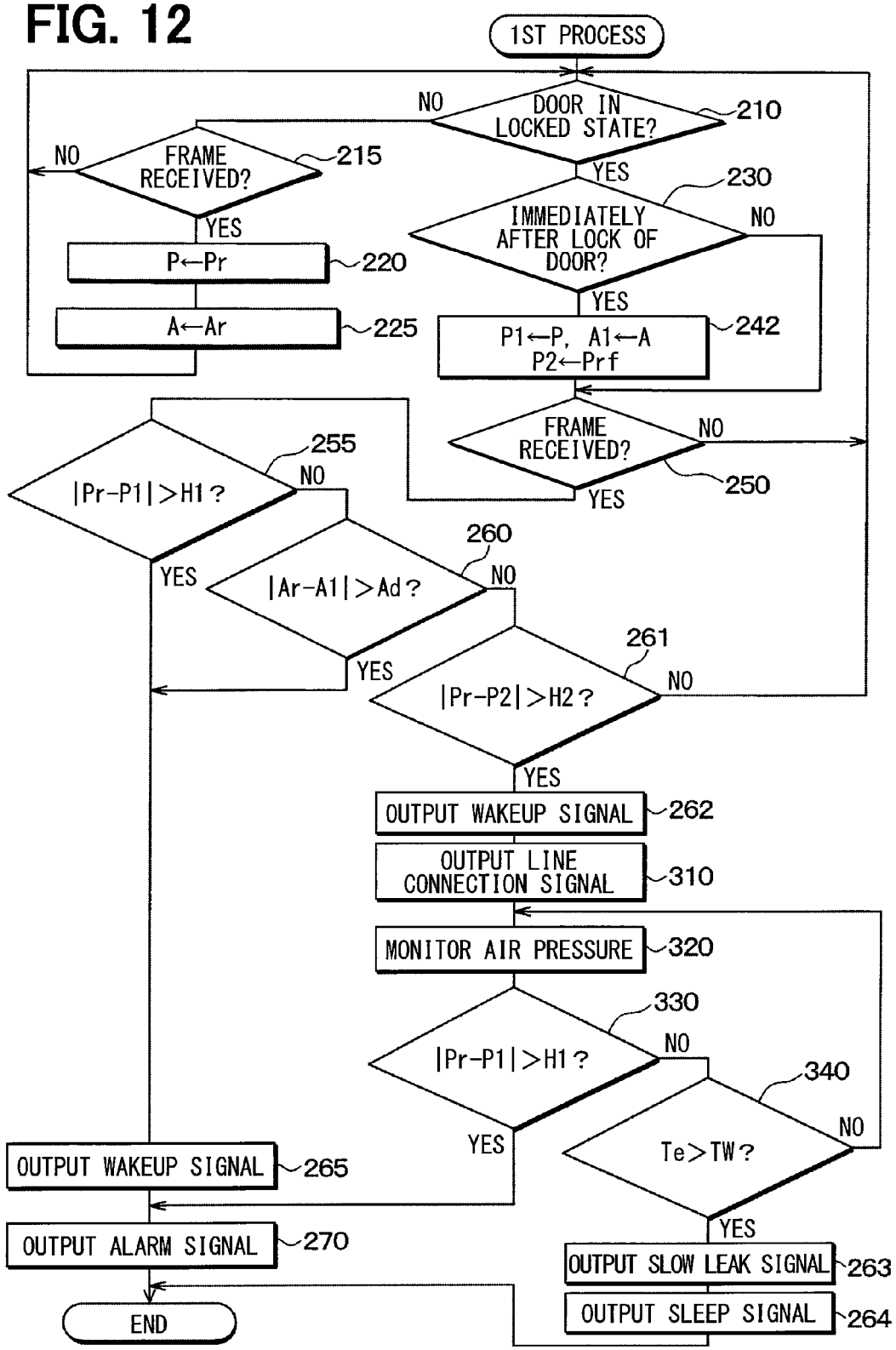
FIG. 12 is a flowchart of a process executed by the first processing portion according to a fourth embodiment.

The first processing portion 33 of the present embodiment performs the process shown in FIG. 12 instead of the process shown in FIG. 8. In the process shown in FIG. 12, steps 310 to 340 are newly added between step 262 and step 263 of the process shown in FIG. 8. The processes (steps 210 to 270) in FIG. 12 excepting the steps 310 to 340 are similar to the steps in FIG. 8. Therefore, detailed explanation will be omitted or simplified in the following description.

Figure 11:
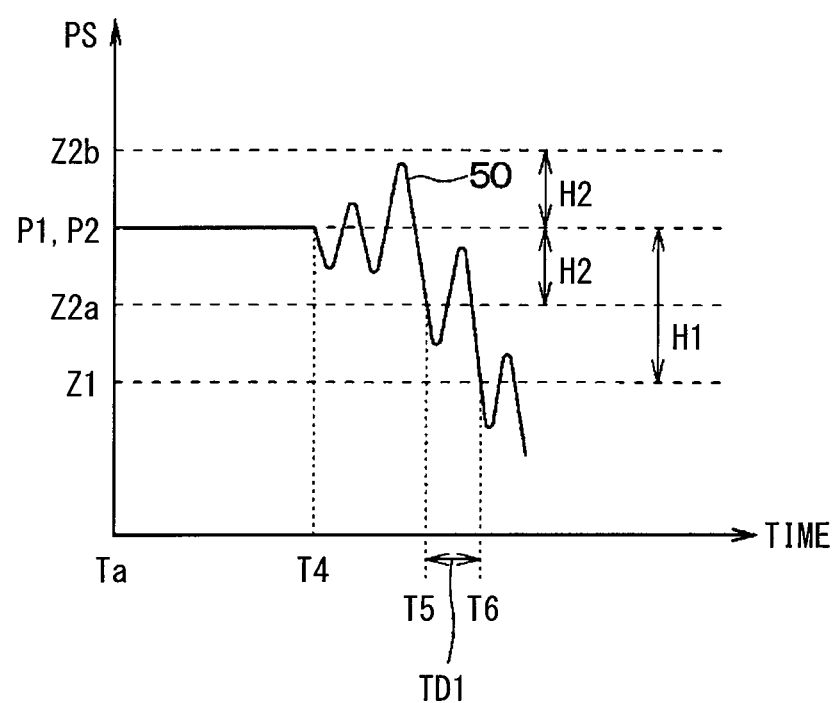
FIG. 11 is a diagram showing a case in which an air pressure decreases lower than a slow leak threshold ($Z2a$) in response to an occurrence of an improper behavior, and continuously decreases lower than a theft determination threshold.
Figure 13:
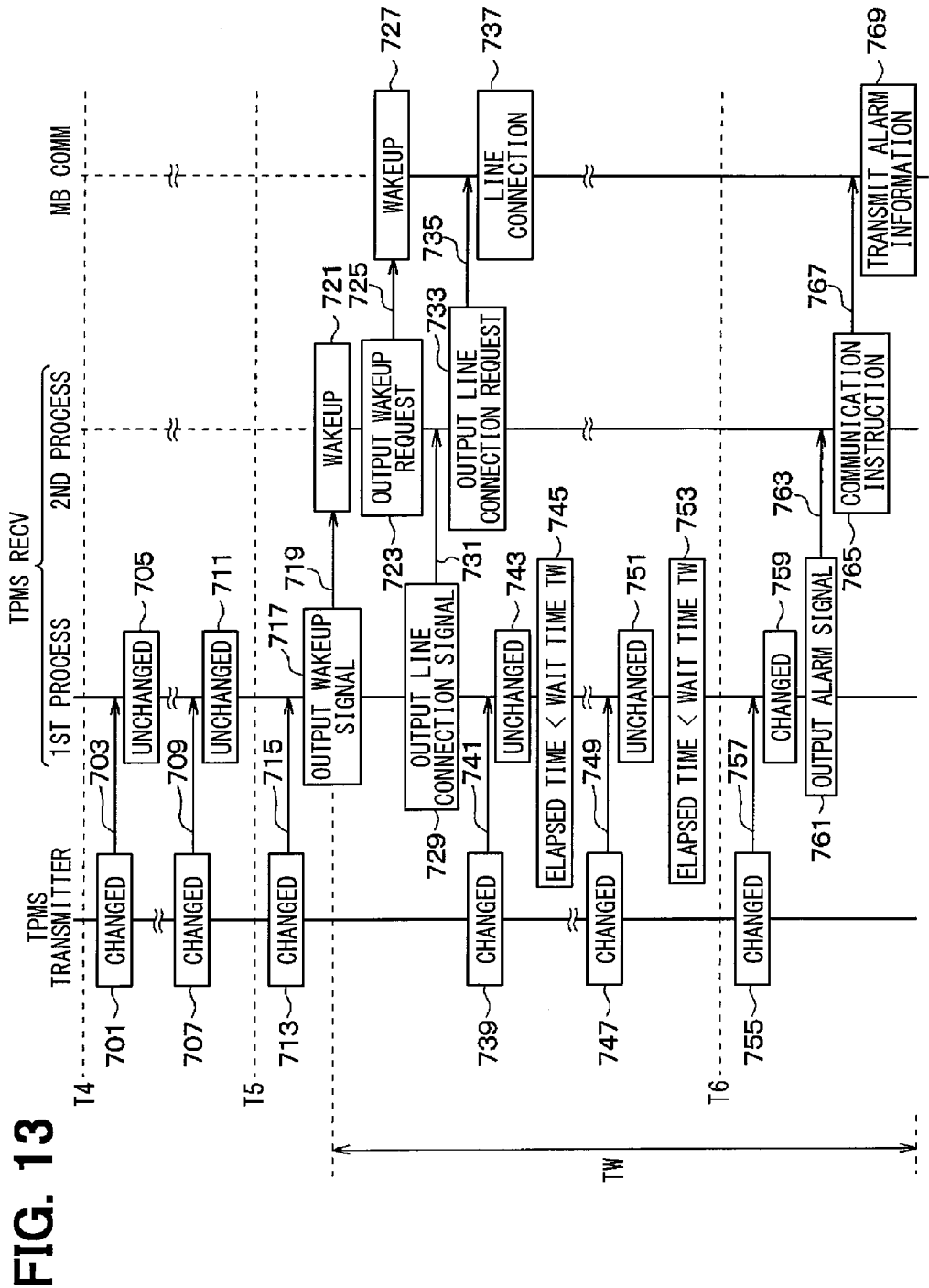
FIG. 13 is a sequence diagram showing an operation of the vehicle theft alert system according to the fourth embodiment.

The following will describe an operation of the vehicle theft alert system when the first processing portion 33 performs the process shown in FIG. 12 along with a case in which the air pressure changes as shown in FIG. 11. FIG. 13 shows a sequence diagram when the vehicle theft alert system operates in such a case as shown in FIG. 11. In this case, suppose that a change of the acceleration of each tire, which makes a positive determination (YES) at step 260, does not occur.

First, the operation of the vehicle theft alert system from the turn-off of the IG to immediately before the time point T4 is similar to the operation of the vehicle theft alert system from the turn-off of the IG to immediately before the time point T2 in the second embodiment (refer to FIG. 7).

Suppose that the vehicle theft starts at the time point T4 and a tire pressure 50 of a tire starts changing accordingly. Then, when the control portion 23 of the corresponding TPMS transmitter in the TPMS transmitters 2a to 2d determines that the air pressure has been changed at step 120 of FIG. 5, the control portion 23 proceeds to step 140. Then, the control portion 23 controls the transmission portion 24 to transmit a frame 703, which includes the transmitter ID of the host transmitter, a latest tire pressure, and a latest acceleration, at step 140 (refer to step 701). With this configuration, the TPMS receiver 3 can receive the frame 703 from the TPMS transmitter.

During the repeated execution of the processes of steps 210, 230, and 250, when the first processing portion 33 receives the frame 703, the first processing portion 33 proceeds from step 250 to step 255. At step 255, the first processing portion 33 reads out the first pressure reference value P1 corresponding to the transmitter ID included in the received frame 703, from the memory. The first processing portion 33 calculates an absolute value of a difference between the read first pressure reference value P1 and the pressure Pr included in the received frame 703. When determining that the absolute value is not higher than the first pressure range H1, the first processing portion 33 proceeds to step 260.

At step 260, the first processing portion 33 reads out the acceleration reference value A1 corresponding to the transmitter ID included in the received frame 703, from the memory. The first processing portion 33 calculates an absolute value of a difference between the read acceleration reference value A1 and the acceleration Ar included in the received frame 703. When determining that the absolute value is not higher than the acceleration range Ad, the first processing portion 33 proceeds to step 261.

At step 261, the first processing portion 33 reads out the second pressure reference value P2 corresponding to the transmitter ID included in the received frame 703, from the memory. The first processing portion 33 calculates an absolute value of a difference between the read second pressure reference value P2 and the pressure Pr included in the received frame 703. When determining that the absolute value is not higher than the second pressure range H2 (refer to step 705), the first processing portion 33 returns to step 210.

The first processing portion 33 determines that the absolute value is not higher at steps 255 and 261 because the amount of change in the pressure is still small when the pressure starts changing at the time point T4 and immediately after the time point T4 as shown in FIG. 11.

From the time point T4 to the time point T5, the detected pressure of the tire is within the range equal to or higher than the value Z2a and equal to or lower than the value Z2b as shown in FIG. 11. Between the time points T4 and T5, the TPMS transmitter corresponding to the tire transmits the frame (for example, the frame 709) including the own transmitter ID, a latest tire pressure, and a latest acceleration, in response to the change in the tire pressure (for example, step 707). However, the first processing portion 33 that has received the frame makes a negative determination (No determination) at steps 255, 260, and 261 (for example, step 711), and returns to step 210 similar to the case when receiving the frame 703. Therefore, during the time period from the time point T4 to the time point T5, the first processing portion 33 repeats steps 210, 230, 250, 255, 260, and 261 in described order each time when the first processing portion 33 receives the frame.

After the time point T5, the detected pressure of the tire is out of the range equal to or higher than Z2a and equal to or lower than Z2b, as shown in FIG. 11.

Then, the TPMS transmitter corresponding to the tire transmits a frame 715 including the own transmitter ID, a latest tire pressure, and a latest acceleration on the basis of the change in the tire pressure (step 713). Thereby, the TPMS receiver 3 can receive the frame 715 from the TPMS transmitter.

During the repeated execution of steps 210, 230, and 250, when the first processing portion 33 receives the frame 715, the first processing portion 33 proceeds from step 250 to step 255. At step 255, the first processing portion 33 calculates an absolute value of a difference between the first pressure reference value P1 and the pressure Pr included in the received frame 715, determines that the absolute value is not higher than the first pressure range H1, and proceeds to step 260. This is because the absolute value is higher than H2 but lower than H1 at this time point.

At step 260, the first processing portion 33 calculates an absolute value of a difference between the acceleration reference value A1 and the acceleration Ar included in the received frame 715. When determining that the absolute value is not higher than the acceleration range Ad, the first processing portion 33 proceeds to step 261.

At step 261, the first processing portion 33 calculates an absolute value of a difference between the second pressure reference value P2 and the pressure Pr included in the received frame 715. When determining that the absolute value is higher than the second pressure range H2, the first processing portion 33 proceeds to step 262.

At step 262, the first processing portion 33 outputs a predetermined wakeup signal 719 to the second processing portion 34 (refer to step 717). The second processing portion 34 wakes up from the sleep state to the active state on reception of the wakeup signal 719 (step 721).

After woken up, the second processing portion 34 outputs a predetermined wakeup request 725 to the mobile communication apparatus 5 immediately (step 723). The mobile communication apparatus 5 wakes up from the sleep state to active state on reception of the wakeup request 725 (step 727), similar to the step 615 of FIG. 7.

After outputting the wakeup signal 719 at step 262, the first processing portion 33 outputs a predetermined line connection signal (LINE CONT) 731 to the second processing portion 34 at step 310 (refer to step 729). The second processing portion 34 outputs a predetermined line connection request 735 to the mobile communication apparatus 5 immediately on reception of the line connection signal 731 (step 733).

The mobile communication apparatus 5 performs the line connection with the service center 43 on reception of the line connection request 735 (step 737). The following will describe the method of the line connection. First, the mobile communication apparatus 5 wirelessly connects to the wireless base station 41, which is connected to the communication networks 42 (the mobile communications network, the internet or the like). A line connection command is transmitted to the service center 43, which is connected to the communication network 42 via the wireless connection. Then, the service center 43 transmits a connection permission notification to the mobile communication apparatus 5 as a reply to the line connection command. The line connection is completed when the mobile communication apparatus 5 receives the connection permission notification. The line connection command may include an ID and a password (both are previously stored in the mobile communication apparatus 5) required to connect to the service center 43. In that case, the service center 43 transmits the connection permission notification to the mobile communication apparatus 5 as a reply to the line connection command only when the ID and password that are included in the line connection command are valid.

When above-described line connection is established, only the line connection between the mobile communication apparatus 5 and service center 43 is established. At this time, an alarm information and slow leak notification are not transmitted yet. Then, the communication line is maintained in the connection state.

After outputting the line connection signal 731 at step 310, the first processing portion 33 proceeds to step 320 and monitors the air pressures. Specifically, the first processing portion 33 waits until reception of the frame from the TPMS transmitter equipped to the tire.

At step 739, the TPMS transmitter transmits the frame (for example, frames 749 and 757) including the own transmitter ID, a latest tire pressure, and a latest acceleration, each time when the detected tire pressure changes (for example, steps 747 and 755). On reception of the frame, the first processing portion 33 proceeds to step 330.

At step 330, the first processing portion 33 performs a determination similar to the determination at step 255. That is, the first processing portion 33 calculates an absolute value of a difference between the first pressure reference value P1 and the pressure Pr included in the frame received at latest step 320, and determines whether the absolute value is higher than the first pressure range H1. When determining that the absolute value of the difference is higher than the first pressure range H1, the first processing portion 33 proceeds to step 270. When determining that the absolute value of the difference is not higher than the first pressure range H1, the first processing portion 33 proceeds to step 340. At step 340, an elapsed time Te after outputting the wakeup signal 719 at immediately preceding step 262 is compared with a predetermined wait time TW (for example, ten minutes) to determine whether the elapsed time is longer than the wait time TW. When determining that the elapsed time is longer than the wait time TW, the first processing portion 33 proceeds to step 263. When determining that the elapsed time is not longer than the wait time TW, the first processing portion 33 returns to step 320.

With the execution of steps 320, 330, and 340, the first processing portion 33 proceeds from step 320 to step 330, for example, on reception of the frame 749 to calculate an absolute value of a difference between the first pressure reference value P1 and the pressure Pr included in the received frame 749. As shown in FIG. 11, at this time point, a detection value of the latest tire pressure (namely, the pressure included in received frame 749) is still higher than the theft determination threshold Z1. Therefore, the first processing portion 33 determines that the above absolute value is lower than the first pressure range H1 (refer to step 743), and proceeds to step 340. In this case, since a time period from the time point T5 to the time point T6 is any one of several seconds to one minute, the first processing portion 33 determines at step 340 that the elapsed time is not longer than the wait time TW (refer to step 745), and returns to step 320.

Until the time point T6, the detection value of the latest tire pressure is higher than the theft determination threshold Z1 and the elapsed time is not longer than the wait time TW. Thus, the first processing portion 33 performs step 320, step 330, step 340, and step 320 in described order each time when the first processing portion 33 receives the frame from the TPMS transmitter equipped to the tire.

For example, on reception of the frame 749, when the first processing portion 33 proceeds from step 320 to step 330 and determines that an absolute value of a difference between the first pressure reference value P1 and the pressure Pr included in the received frame 749 is lower than the first pressure range H1 (refer to step 751), the first processing portion 33 proceeds to step 340. At step 340, the first processing portion 33 determines that the elapsed time is no longer than the wait time TW (refer to step 753), and the first processing portion 33 returns to step 320.

After the time point T6, the detected pressure of the tire is lower than the theft determination threshold Z1, as shown in FIG. 11.

The TPMS transmitter corresponding to the tire transmits a frame 757 including the own transmitter ID, a latest tire pressure, and a latest acceleration when the tire pressure changes (step 755). With this configuration, the TPMS receiver 3 can receive the frame 757 from the TPMS transmitter.

The first processing portion 33 receives the frame 757, and proceeds from step 320 to step 330 to calculate an absolute value of a difference between the first pressure reference value P1 and the pressure Pr included in the received frame 749. A detection value of the latest tire pressure (namely, the pressure included in the received frame 757) is lower than the theft determination threshold Z1 at this point as shown in FIG. 11. Therefore, the first processing portion 33 determines that the above absolute value is higher than the first pressure range H1 (refer to step 759), and proceeds to step 270.

At step 270, a predetermined alarm signal 763 is outputted to the second processing portion 34 (refer to step 761). Then, the process shown in FIG. 12 is ended. On reception of the alarm signal 763, the second processing portion 34 outputs a predetermined communication instruction 767 to the mobile communication apparatus 5 to report theft of the vehicle (step 765).

The mobile communication apparatus 5 performs the communication process on reception of the communication instruction 767 (step 769). Specifically, the alarm information indicating that theft may have occurred is transmitted to the service center 43 (equivalent to one example of the transmission destination apparatuses). Since the mobile communication apparatus 5 has already completed the line connection with the service center 43 at step 737, the mobile communication apparatus 5 and service center 43 have been connected to one another at the time of performing the communications. Therefore, in this communication process, the line connection to the service center 43 is omitted to perform data transmission of the alarm information. Therefore, when a positive determination (YES determination) is made at step 330, the data transmission of the alarm information can be completed immediately.

The following will describe a case in which a detection value of the tire pressure is lower than the slow leak threshold Z2a caused by an actual slow leak. This case is different from the case shown in FIG. 7. In this case, after the detection value of the tire pressure decreases lower than the slow leak threshold Z2a, until an elapsed time after the output of the wakeup signal 719 at step 262 exceeds the predetermined wait time TW, the detection value of the air pressure of the tire maintains equal to or higher than the theft determination threshold Z1. This is because a rate of the decrease of the tire pressure due to slow leak is very low and it takes several days to dozens of days for the tire pressure to become lower than the theft determination threshold Z1 after the tire pressure becomes lower than the slow leak threshold Z2a. In that case, during repeated execution of steps 320, 330, and 340, when the first processing portion 33 determines that the elapsed time exceeds the wait time TW at step 340 immediately after the elapsed time exceeds the wait time TW, the first processing portion 33 proceeds to step 263.

The operations after step 263 are similar to the second embodiment (see 617 to 637 of FIG. 7). That is, at step 263, the predetermined slow leak signal is outputted to the second processing portion 34, and as a result, the second processing portion 34 outputs the predetermined slow leak notification instruction to the mobile communication apparatus 5. The mobile communication apparatus 5 performs the slow leak notification on reception of the slow leak notification instruction, similar to the second embodiment. In this slow leak notification instruction, data transmission of the alarm information is possible without an establishment of a new line connection to the service center 43 for the same reason similar to the transmission of the alarm information. After that, the first processing portion 33 proceeds to step 264, outputs the predetermined sleep signal to the second processing portion 34, and then ends the process shown in FIG. 12. The second processing portion 34 outputs the predetermined sleep request to the mobile communication apparatus 5 on reception of the sleep signal. Then, the second processing portion 34 switches from the active state to the sleep state. The mobile communication apparatus 5 switches from the active state to the sleep state on reception of the sleep request.

The above shows the configuration and operation of the present embodiment. The inventor of the present application has focused on the following point. In case of slow leak, a long time (for example, any one of several days to dozen of days) elapses until the tire pressure decreases lower than the theft determination threshold Z1 after the tire pressure decreases lower than the slow leak threshold Z2a. On the other hand, in case of an improper behavior (theft, mischief), even when the detection value of the tire pressure is lower than the slow leak threshold Z2a before the detection value decreases lower than the theft determination threshold Z1 in dependence on a detection timing of the tire pressure, only a considerably short time within several minutes elapses until the detection value becomes lower than the theft determination threshold Z1 after that.

The forgoing embodiments of the present disclosure are made in view of above-described point. That is, when a detection value of an air pressure of a certain tire becomes lower than the slow leak threshold Z2a, slow leak may be erroneously determined as theft only by one change. Therefore, the air pressure of the tire is monitored for the predetermined wait time TW (for example, ten minutes). When the pressure does not become lower than the theft determination threshold Z1 during the wait time TW, it is determined that slow leak has occurred. Then, a process for the slow leak determination is carried out (from step 340 to step 263).

On the other hand, when the detection value of the air pressure becomes lower than the theft determination threshold Z1 during the wait time TW for monitoring, it is determined that theft has been occurred and the alarm signal is outputted (from step 330 to step 270).

With above-described configuration, the user avoids not only an erroneous determination when theft occurs but also delusion by confusing information such as theft information received temporarily after reception of slow leak information, and can avoid a handle of both theft information and slow leak information.

Usually, it is considered that the air pressure cannot increase during slow leak. Thus, in the present disclosure, the following operation is carried out. The first processing portion 33 sequentially determines whether a detection value of the air pressure of the tire becomes higher than the slow leak threshold Z2a while the monitoring for the wait time TW (during repeated execution of steps 320, 330, and 340). Even once the detection value becomes higher than the slow leak threshold Z2a, a flag showing that the detection value is higher than the slow leak threshold Z2a is set from off state to on state. Then, when the process proceeds from step 340 to step 263, the slow leak signal may be outputted when the flag is in the off state, and no slow leak signal may be outputted when the flag is in the on state. In such a way, a frequency of outputting useless slow leak signals (step 263) can be reduced. This flag may be reset to off state each time when the step 262 is performed.

In each of the foregoing embodiments, the first processing portion 33 performs step 210 of FIG. 6 and FIG. 8 to function as one example of a lock state determination portion, performs steps 230 to 270 of FIG. 6, FIG. 8, FIG. 10, and FIG. 12 and steps 310 to 340 of FIG. 12 to function as one example of a transmission control portion, performs steps 255, 260, 265, and 270 of FIG. 6, FIG. 8, FIG. 10, and FIG. 12 to function as one example of a first transmission control portion, and performs steps 261, 262, 263, 310 to 340 of FIG. 12 to function as one example of a second transmission control portion.

It is noted that a flowchart or the processing of the flowchart in the present disclosure includes steps, each of which is represented, for instance, as S100. Further, each step can be divided into several sub-steps while several steps can be combined into a single step. Furthermore, each of such configured steps can be also referred to as a circuit, device, module, or means.

(Other Embodiments)

The present disclosure is not limited to the above embodiments, and can be suitably changed within the range described in the present disclosure. Each above embodiment is not unrelated to each other, and can be suitably combined unless the combination is clearly impossible. In each above embodiment, it is clear that components forming the embodiment are not necessarily indispensable unless the elements are explicitly indispensable and thought to be theoretically indispensable. When numerals such as the number, values, amounts, and ranges of components of each embodiment are referred to in each above embodiment, the numerals are not limited to specific ones unless the numerals are explicitly indispensable and clearly thought to be theoretically limited to the specific ones. In each above embodiment, when shapes and positional relationships of elements are referred to, the shapes and positional relationships are not limited to specific ones unless the shapes and positional relationship are explicitly shown and theoretically limited to the specific ones.

(First Modification)

In the second embodiment, the first processing portion 33 ends the process shown in FIG. 8 after transmitting the sleep signal 629 at step 264 of FIG. 8. However, this procedure is not limited the described configuration.

For example, after transmitting the sleep signal 629 at step 264 of FIG. 8, the first processing portion 33 may end the process shown in FIG. 8 and may start the process shown in FIG. 6. However, in the process shown in FIG. 6, when it is determined that the frame has been received at step 250, the process proceeds to step 260 instead of to step 255. Thus, even after a great decrease of the air pressure is caused by the slow leak, theft can be detected and reported on the basis of the accelerations of the tires.

(Second Modification)

In the second embodiment and first modification, when the owner of the vehicle who has received the slow leak notification inflates each tire with air, the owner may reset a manipulation portion (not shown) of the TPMS receiver 3. The first processing portion 33 of the TPMS receiver 3 may restart the process shown in FIG. 8 when the reset is performed to the manipulation portion (after ending the process shown in FIG. 6 if the process shown in FIG. 6 is being performed).

(Third Modification)

Figure 14:
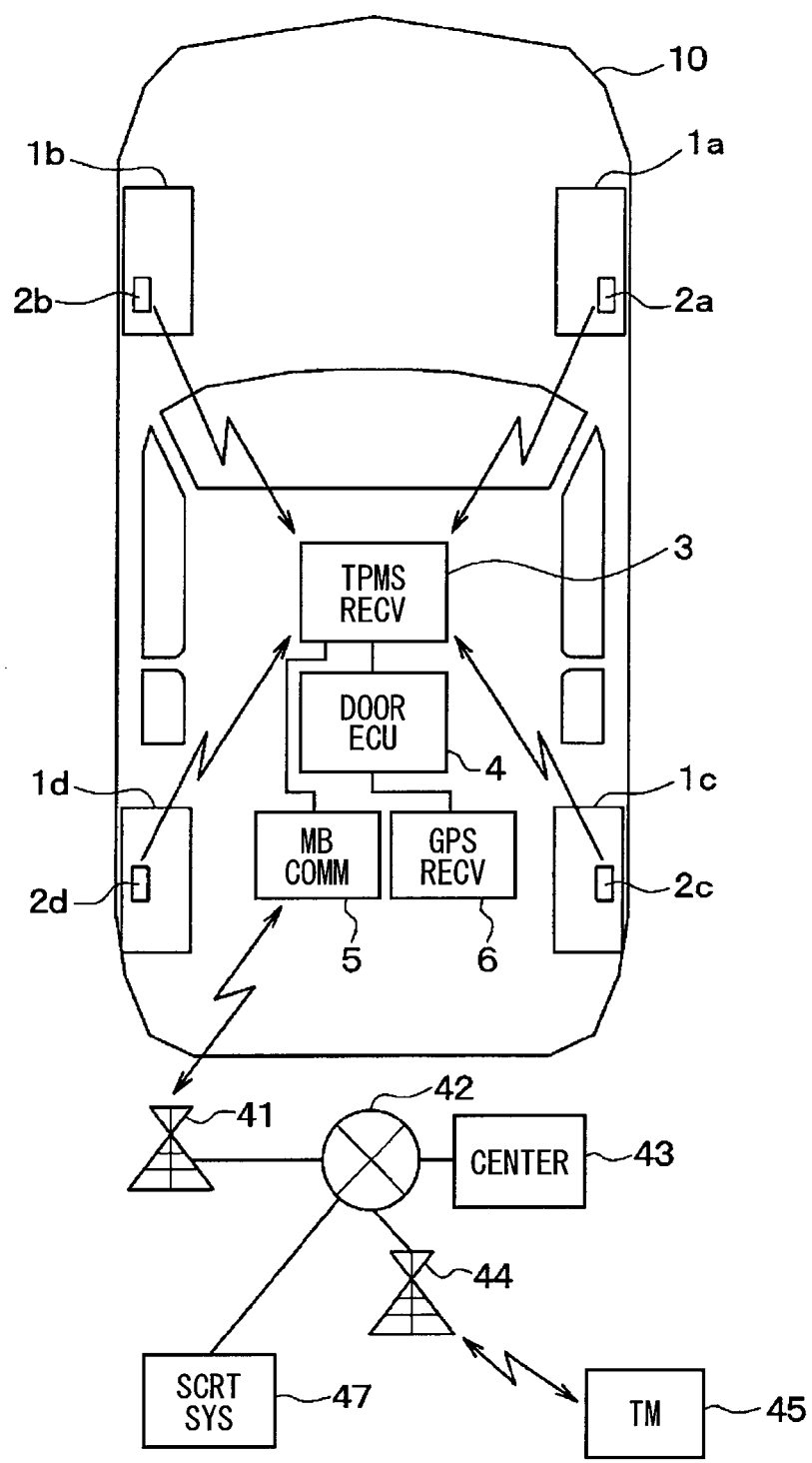
FIG. 14 is a diagram showing a configuration of the vehicle theft alert system according to a third modification.

In each of the above embodiments and each modification, the vehicle theft alert system may include a global positioning system receiver (GPS RECV) 6 (may be an autonomous GPS receiver or a network assist GPS receiver) equipped to the vehicle as shown in FIG. 14. Hereafter, the global positioning system receiver 6 is abbreviated to the GPS receiver 6. The GPS receiver 6 switches between an active state for specifying a current position with high power consumption and a sleep state in which a determination of a current position is disabled but lower power is consumed than in the active state.

The GPS receiver 6 switches between the active state and sleep state at the same timing and in synchronization with the mobile communication apparatus 5.

Specifically, the GPS receiver 6 switches from the active state to the sleep state when the IG is turned off. When transmitting the wakeup requests 557 and 613 to the mobile communication apparatus 5, the second processing portion 34 outputs a wakeup request also to the GPS receiver 6. On reception of this wakeup request, the GPS receiver 6 wakes up from the sleep state to the active state, and starts specifying of a current position.

When transmitting the sleep request 633 to the mobile communication apparatus 5, the second processing portion 34 outputs a sleep request also to the GPS receiver 6. On reception of this sleep request, the GPS receiver 6 switches from the active state to the sleep state.

When transmitting alarm information 569 to the service center 43, the mobile communication apparatus 5 acquires a current position (current position of the vehicle) specified after the GPS receiver 6 receives the above wakeup request, and includes the current position in the alarm information 569.

On reception of the alarm information 569 including the current position, the service center 43 includes this current position into the query information to be transmitted to the user terminal 45 and also into the wait request and dispatch request to be transmitted to the security system 47. The user terminal 45 and security system 47 display the information related to the current position to the owner of the vehicle. Thereby, the owner of the vehicle and the security company (or the police) can acquire the current position of the vehicle subjected to theft.

(Fourth Modification)

In the first and second embodiments, the first pressure reference value P1, acceleration reference value A1, and second pressure reference value P2 are set on the basis of a tire pressure or acceleration received from the TPMS transmitter before the IG is turned off. However, this procedure is not necessarily essential. For example, a tire pressure or acceleration received from the TPMS transmitter immediately after the IG is turned off may be used.

In this case, for example, the first processing portion 33 of the TPMS receiver 3 transmits a transmission request to each of the TPMS transmitters 2a to 2d only once on reception of a door lock notification 523 from the second processing portion 34. On reception of the transmission request, each control portion 23 of the TPMS transmitters 2a to 2d may transmit a frame containing a transmitter ID of the host transmitter, a current air pressure detected by the pneumatic sensor 21, and a current acceleration detected by the acceleration sensor 22, to the TPMS receiver 3. The first processing portion 33 may set the pressure in the transmitted frame as the first pressure reference value P1 and the second pressure reference value P2, and may set the acceleration in the frame as the acceleration reference value A1.

In this case, the TPMS receiver 3 includes a transmission portion for transmitting a request signal from the TPMS receiver 3 to each of the TPMS transmitters 2a to 2d. Each of the TPMS transmitters 2a to 2d includes a reception portion to receive the above request signal.

(Fifth Modification)

In the first and second embodiments, when the TPMS transmitters 2a to 2d are not requested to reduce power consumption, the TPMS transmitters 2a to 2d may transmit the frames even when there is no change in the tire pressures and accelerations. Specifically, the control portion 23 of each TPMS transmitters 2a to 2d may proceed to step 140 immediately after step 110 of FIG. 5.

(Sixth Modification)

In the first and second embodiments, when the doors are unlocked and the door unlock signal is inputted into the second processing portion 34, the second processing portion 34 wakes up from the sleep state to active state, and outputs the door unlock notification to the first processing portion 33. In the alarm mode, on reception of the door unlock notification, the first processing portion 33 cancels the alarm mode and switches to the normal mode. In case of normal unlock by the owner of the vehicle, such operation causes no problem.

However, when theft occurs, the door unlock signal may be inputted into the second processing portion 34 in response to pry of the door. To handle such a case, even when the door unlock signal is inputted into the second processing portion 34, the alarm mode of the first processing portion 33 may not be canceled. For example, even after the door unlock signal is inputted into the second processing portion 34 and the door unlock notification is inputted into the first processing portion 33, the first processing portion 33 may continue to determine that the doors are in the locked state at step 210.

However, even in such a case, it is desirable to cancel the alarm mode in response to the normal unlock by the owner of the vehicle. Then, the following operation may be performed.

The first processing portion 33 can refer and rewrite an alarm cancel flag in the memory of the TPMS receiver 3. At the operation switch to the alarm mode, this alarm cancel flag is set to off state.

When the door unlock signal is inputted into the second processing portion 34 and the door unlock notification is inputted into the first processing portion 33, the first processing portion 33 refers this alarm cancel flag. When the alarm cancel flag is in the off state, it is determined that the doors have been locked at step 210. That is, at step 210, the doors are determined to be locked when the alarm cancel flag is in the off state or when the door unlock notification is not received after reception of the door lock notification. The doors are determined to be in the non-locked state either when the alarm cancel flag is in the on state or when the door unlock notification is received after reception of the door lock notification. Accordingly, the alarm mode is not cancelled in response to the door unlock signal based on pry of the door.

When the user (owner of the vehicle) wants to enter the vehicle again, the user performs a predetermined alarm cancel on the user terminal 45. In response to this alarm cancel, the user terminal 45 transmits an alarm cancel request to the service center 43 via the base station 44 and communication network 42.

This alarm cancel request includes the mobile communication apparatus ID of the mobile communication apparatus 5 preliminarily registered in the user terminal 45. On reception of this alarm mode cancel request, the service center 43 transmits an alarm cancel instruction to the mobile communication apparatus 5 corresponding to the mobile communication apparatus ID included in the alarm cancel request. A correspondence between the mobile communication apparatus ID and address of the mobile communication apparatus 5 is previously registered in the service center 43.

To receive this alarm cancel instruction, the mobile communication apparatus 5 is always in the active state even after the turn-off of the IG in sixth modification. After receiving this alarm cancel instruction, the mobile communication apparatus 5 outputs an alarm cancel signal to the first processing portion 33. The first processing portion 33 sets the alarm cancel flag to the on-state on reception of this alarm cancel signal.

After that, when the user unlocks the doors of the vehicle, the door unlock signal is inputted from the door lock ECU 4 to the second processing portion 34. The second processing portion 34 wakes up from the sleep state to active state on reception of this door unlock signal, and outputs the door unlock notification to the first processing portion 33.

Thus, the first processing portion 33 receives the door unlock notification with the alarm cancel flag being in the on state. Therefore, the first processing portion 33 determines that the doors have not been locked at step 210 immediately after reception of the door unlock notification, and proceeds to step 215 to cancel the alarm mode and switches to the normal mode.

(Seventh Modification)

To receive the alarm cancel instruction in sixth modification, the mobile communication apparatus 5 is not always in the active state even after the turn-off of the IG, and switches to the sleep state, similar to the first and second embodiments. When the user (owner of the vehicle) wants to enter the vehicle again, the user performs a predetermined alarm cancel on the user terminal 45. The user terminal 45 transmits the alarm cancel request to the service center 43 via the base station 44 and communication network 42 on reception of this alarm cancel. This alarm cancel request includes the mobile communication apparatus ID of the mobile communication apparatus 5 previously registered in the user terminal 45.

On reception of this alarm mode cancel request, the service center 43 transmits the alarm cancel instruction to the mobile communication apparatus 5 corresponding to the mobile communication apparatus ID included in the alarm cancel request. When the mobile communication apparatus 5 is unable to communicate with the external apparatuses of the vehicle 10 (in the sleep state in which power consumption is lower than in the active state), the service center 43 temporarily holds and stores the alarm cancel instruction in the service center.

After that, when the user unlocks the doors of the vehicle, the door unlock signal is inputted from the door lock ECU 4 to the second processing portion 34. The second processing portion 34 wakes up from the sleep state to active state on reception of this door unlock signal, and outputs the door unlock notification to the first processing portion 33. The second processing portion 34 outputs the wakeup signal to the first processing portion 33 and mobile communication apparatus 5 to wake up the first processing portion 33 and the mobile communication apparatus 5 from the sleep state to active state sequentially.

After the mobile communication apparatus 5 wakes up from the sleep state to active state, the mobile communication apparatus 5 is connected with the communication network 42 (the mobile communications network, the internet), and wirelessly connected with the wireless base station 41. Then, the service center 43 connected to the communication network 42 is notified via this wireless connection. The service center 43 compares the mobile communication apparatus ID of the connected mobile communication apparatus 5 to the signal transmission destination (mobile communication apparatus ID) that is unable to communicate immediately before and thus held temporarily, and when the IDs match one another, transmits the alarm cancel instruction to the mobile communication apparatus 5. The mobile communication apparatus 5 can receive the alarm cancel instruction by communicating with the service center 43 that has just switched to the active state. On reception of the alarm cancel signal, the first processing portion 33 sets the alarm cancel flag to the on state on the basis of the alarm cancel instruction. Thereby, detection of theft and prevention of a false report of theft are possible while reducing power consumption. The correspondence between the mobile communication apparatus ID and address of the mobile communication apparatus 5 is previously registered.

(Eighth Modification)

In the first and second embodiments, when the doors are unlocked and the door unlock signal is inputted into the second processing portion 34, the second processing portion 34 wakes up from the sleep state to active state, and outputs the door unlock notification to the first processing portion 33. In the alarm mode, on reception of this door unlock notification, the first processing portion 33 cancels the alarm mode and switches to the normal mode. In case of normal unlock by the owner of the vehicle, such operation causes no problem.

However, upon occurrence of theft, the door unlock signal may be inputted into the second processing portion 34 in response to pry of the door. To handle such a case, even when the door unlock signal is inputted into the second processing portion 34, the alarm mode of the first processing portion 33 may not be canceled. For example, even after the door unlock signal is inputted into the second processing portion 34 and the door unlock notification is inputted into the first processing portion 33, the first processing portion 33 may continue to determine that the doors have been locked at step 210.

Even in such a case, it is desirable to cancel the alarm mode in response to the normal unlocking by the owner of the vehicle. Therefore, when the normal door unlock signal from the owner of the vehicle is the door unlock signal transmitted from a keyless entry system or a smart entry (registered trade mark) system or in response to a door unlock instruction remotely controlled from the previously registered user terminal 45, it is determined to be the normal door unlock signal from the owner of the vehicle to cancel the alarm mode. Specific procedure is as follows.

The first processing portion 33 can reference and rewrite the alarm cancel flag in the memory of the TPMS receiver 3. At the operation switch to the alarm mode, this alarm cancel flag is set to the off state.

When the user (owner of the vehicle) wants to enter the vehicle again, the user manipulates a portable key to unlock the doors of the vehicle. Specifically, an unlock button provided to the portable key is pushed. In response to this manipulation, the portable key wirelessly transmits a predetermined door unlock instruction to the door lock ECU 4.

The door lock ECU 4 includes a wireless communication portion. When this wireless communication portion receives the above door unlock instruction, the door unlock signal is inputted to the second processing portion 34 after the doors are unlocked. This door unlock signal includes a wireless reception flag. A value of the wireless reception flag is set to the on state.

When such a door unlock signal is inputted into the second processing portion 34, the second processing portion 34 inputs the door unlock notification into the first processing portion 33. This door unlock notification includes a wireless reception flag whose value is in the on state.

When such a door unlock notification is inputted into the first processing portion 33, the first processing portion 33 switches the alarm cancel flag to the on state on the basis of the on state of the wireless reception flag in the received door unlock notification. Then, the first processing portion 33 refers to this alarm cancel flag. On reception of the door unlock notification and on the basis of the alarm cancel flag being in the on state, it is determined that the doors have not been locked at step 210. When the user manipulates the portable key to unlock the doors of the vehicle, the first processing portion 33 cancels the alarm mode.

When the user wants to enter the vehicle again after the alarm cancel flag is set to the off state as above, the user approaches the vehicle with carrying the portable key and contacts a doorknob of the vehicle with his or her hand.

In this case, the door lock ECU 4 includes the wireless communication portion. Predetermined round trip communications are made between this wireless communication portion and portable key automatically. For example, the wireless communication portion transmits a request signal, the portable key that has received this request signal transmits an answer signal including a key ID peculiar to the portable key to the door lock ECU 4, and the wireless communication portion receives this answer signal. One execution of such transmission and reception may correspond to the above predetermined round trip communication. Alternatively, multiple executions of such transmission and reception may correspond to the above predetermined round trip communications.

When the predetermined round trip communications are realized, the door lock ECU 4 switches from the locked state in which the doors are not unlocked even when the user's hand contacts the doorknob to the unlock wait state. When the user's hand contacts the doorknob in the unlock wait state, the door lock ECU 4 detects this contact and unlocks the doors, and then inputs the door unlock signal to the second processing portion 34. The value of the wireless reception flag in this door unlock signal is set to the on state.

When such a door unlock signal is inputted into the second processing portion 34, the second processing portion 34 inputs the door unlock notification to the first processing portion 33. The value of the wireless reception flag in this door unlock notification is set to the on state.

When such a door unlock notification is inputted into the first processing portion 33, the first processing portion 33 switches the alarm cancel flag to the on state on the basis of the on state of the wireless reception flag in the received door unlock notification. After that, the first processing portion 33 references this alarm cancel flag. The first processing portion 33 determines at step 210 that the doors have not been locked on reception of the door unlock notification and on the basis of the on state of the alarm cancel flag. Thus, when the user approaches the vehicle with carrying the mobile key and contacts the doorknob of the vehicle with the hand to unlock the doors of the vehicle, the first processing portion 33 cancels the alarm mode.

A predetermined door unlock manipulation is performed to the user terminal 45 previously registered in the service center 43. The user terminal 45 transmits the door unlock request to the service center 43 via the base station 44 and communication network 42 on reception of this door unlock request.

This alarm cancel request includes the mobile communication apparatus ID of the mobile communication apparatus 5 previously registered in the user terminal 45. The service center 43 transmits the door unlock instruction from the previously registered user terminal 45 to the mobile communication apparatus 5 corresponding to the mobile communication apparatus ID included in the door unlock request on reception of the door unlock request. In the service center 43, the correspondence between the mobile communication apparatus ID and address of the mobile communication apparatus 5 is previously registered.

To receive this alarm cancel instruction, the mobile communication apparatus 5 is always in the active state even after the turn-off of the IG in eighth modification. The mobile communication apparatus 5 that has received this door unlock instruction outputs the door unlock notification to the first processing portion 33. The value of the wireless reception flag in this door unlock notification is set to the on state.

When such a door unlock notification is inputted into the first processing portion 33, the first processing portion 33 switches the alarm cancel flag to the on state on the basis of the on state of the wireless reception flag in the received door unlock notification. The first processing portion 33 references the alarm cancel flag. On reception of the door unlock notification and on the basis of the alarm cancel flag being in the on state, it is determined that the doors have not been locked at step 210. When the user performs the predetermined door unlock manipulation to the user terminal 45 previously registered in the service center 43, the first processing portion 33 cancels the alarm mode.

In contrast, when the doors are unlocked due to pry of the door regardless of wireless communications from the external apparatuses of the vehicle 10, the door lock ECU 4 inputs the door unlock signal into the second processing portion 34, but sets the value of the wireless reception flag in this door unlock signal to the off state.

When such a door unlock signal is inputted into the second processing portion 34, the second processing portion 34 inputs the door unlock notification into the first processing portion 33, but sets the value of the wireless reception flag in this door unlock notification to the off state.

When such a door unlock notification is inputted into the first processing portion 33, the first processing portion 33 keeps the alarm cancel flag in the off state on the basis of the off state of the wireless reception flag in the door unlock notification. Then, the first processing portion 33 refers to this alarm cancel flag. When the alarm cancel flag is in the off state, it is determined that the doors have been locked at step 210. Thus, the alarm mode is not canceled in response to the door unlock signal based on pry of the door.

Thus, in eighth modification, the first processing portion 33 cancels the alarm mode when the doors have been unlocked on the basis of various communications between the external apparatuses of the vehicle 10 and the vehicle, and maintains the alarm mode when the doors have been unlocked regardless of communications between the external apparatuses of the vehicle 10 and the vehicle (for example, due to pry of the door).

(Ninth Modification)

In each above embodiment and each modification, the TPMS transmitters 2a to 2d may realize the function of the first processing portion 33, and the first processing portion 33 may be omitted in the TPMS receiver 3. Specifically, the first processing portion 33 may be provided in each of the TPMS transmitters 2a to 2d. In this case, transfers of signals between the control portion 23 and the first processing portion 33 in the same TPMS transmitter are made by cables instead of wireless. On the other hand, transfers of signals between the first processing portion 33 and the second processing portion 34 are made wirelessly.

Thus, four first processing portions 33 are equipped to the TPMS transmitters respectively. In this case, each control portion 23 transmits the frame to the first processing portion 33 in the same TPMS transmitter, and the second processing portion 34 transmits the same signals (door lock notification 525, door unlock notification) to all the first processing portions 33.

Each first processing portion 33 may be set only the first pressure reference value P1, acceleration reference value A1, and the second pressure reference value P2 corresponding to the host TPMS transmitter.

(Tenth Modification)

The sleep state of each above embodiment may be replaced with an operation-off state (power-off state).

(Eleventh Modification)

In each above embodiment, the turn-on and turn-off of the IG of the vehicle 10 that travels by power of an internal combustion engine are mentioned as one example of the turn-on and turn-off of the main power of the vehicle. However, when the vehicle 10 is an electric vehicle driven by power of an electric motor, the turn-on and turn-off of the main power may not be the turn-on and turn-off of the IG.

(Twelfth Modification)

In the first and second embodiments, each of the TPMS transmitters 2a to 2d may detect only the air pressure of the tire from the air pressure of the tire and the acceleration of the tire and transmit the detected pressure. In that case, it is always determined that "no change has occurred" at step 130 in the process shown in FIG. 5. In the process shown in FIG. 6 and FIG. 8, it is always determined that "the value is not higher than the acceleration range Ad" at step 260.

(Thirteenth Modification)

In the first embodiment, each of the TPMS transmitters 2a to 2d detects only the acceleration of the tire from the air pressure of the tire and the acceleration of the tire and transmits the detected acceleration. In that case, at step 120 in the process shown in FIG. 5, it is always determined that "no change has occurred." In the process shown in FIG. 6, it is always determined that "the value is not higher than the first pressure range H1" at step 255.

(Fourteenth Modification)

In the first and second embodiments, the same transmission algorithm is used in the TPMS transmitters 2a to 2d irrespective of the on or off state of the IG and the locking state of the doors. That is, it is determined whether any one of the air pressure and acceleration of the tire has been changed, and only when a positive determination is made, the frame including a latest tire pressure and acceleration is transmitted. When it is determined that either of the air pressure or acceleration of the tire has not changed, no frame is transmitted.

However, such a procedure is not always necessary. For example, the TPMS transmitters 2a to 2d may always transmit the frame including a latest tire pressure and acceleration periodically irrespective of the on or off state of the IG and the locking state of the doors.

What is claimed is:

1. A vehicle theft alert system comprising:
   a lock state determination portion configured to determine whether doors of a vehicle are in locked states, the doors entering the locked states after a turn-off of a main power of the vehicle; and
   a transmission control portion configured to switch from a normal mode to an alarm mode when the lock state determination portion determines that the doors are in the locked states, wherein
   when a change amount of an air pressure of a tire of the vehicle is greater than a first pressure range in the alarm mode or when a change amount of an acceleration applied to the tire is greater than a predetermined acceleration range in the alarm mode, the transmission control portion controls a mobile communication apparatus equipped to the vehicle to transmit an alarm information to an external apparatus located outside the vehicle,
   the transmission control portion includes:
   a first transmission control portion that controls the mobile communication apparatus to transmit the alarm information to the external apparatus when the air pressure of the tire changes relative to a first pressure reference value by an amount greater than the first pressure range in the alarm mode; and
   a second transmission control portion that controls the mobile communication apparatus to transmit, to the external apparatus, a slow leak information indicating that a decrease of the air pressure is caused by a slow leak when the air pressure of the tire becomes equal to or higher than a theft determination threshold and lower than a slow leak threshold in the alarm mode, the theft determination threshold is obtained by subtracting the first pressure range from the first pressure reference value and the slow leak threshold is set to be higher than the theft determination threshold.

2. The vehicle theft alert system according to claim 1, wherein,
   after the air pressure of the tire becomes lower than the slow leak threshold, the second transmission control portion controls the mobile communication apparatus to transmit the slow leak information to the external apparatus when the air pressure of the tire maintains equal to or higher than the theft determination threshold for a predetermined wait time, and
   after the air pressure of the tire becomes lower than the slow leak threshold, the second transmission control portion controls the mobile communication apparatus to transmit the alarm information to the external apparatus when the air pressure of the tire further becomes lower than the theft determination threshold during the wait time.

3. The vehicle theft alert system according to claim 1, further comprising:
   the mobile communication apparatus configured to transmit the alarm information to the external apparatus;
   a first processing portion configured to include the lock state determination portion and the transmission control portion; and
   a second processing portion configured to consume a higher power than the first processing portion and being capable of controlling the mobile communication apparatus,
   wherein:
   when the main power of the vehicle is in an on state, the mobile communication apparatus and the second processing portion operate in active states;
   when the doors are in the locked states after the turn-off of the main power of the vehicle, the mobile communication apparatus and the second processing portion operate in low power consumption states, and each of the mobile communication apparatus and the second processing portion consumes a lower power in the low power consumption state compared with the active state;
   in the alarm mode, when the air pressure of the tire changes relative to the first pressure reference value by the amount greater than the first pressure range or when the acceleration applied to the tire changes relative to an acceleration reference value by an amount greater than the acceleration range, the transmission control portion of the first processing portion outputs a wakeup signal to the second processing portion;
   on reception of the wakeup signal, the second processing portion wakes up from the low power consumption state to the active state and outputs a wakeup request to the mobile communication apparatus; and
   on reception of the wakeup request, the mobile communication apparatus wakes up from the low power consumption state to the active state and transmits the alarm information to the external apparatus.

4. The vehicle theft alert system according to claim 3, wherein:
   the vehicle is equipped with a global positioning system receiver that operates in an active state when the main power of the vehicle is in the on state and operates in a low power consumption state when the doors of the vehicle are in the locked state after the turn-off of the main power, the global positioning system receiver consumes a lower power in the low power consumption state compared with the active state;

on reception of the wakeup signal, the second processing portion wakes up from the low power consumption state to the active state and outputs the wakeup request to both the mobile communication apparatus and the global positioning system receiver;

on reception of the wakeup request, the global positioning system receiver wakes up from the low power consumption state to the active state and starts to specify a current position of the vehicle; and on reception of the wakeup request, the mobile communication apparatus wakes up from the low power consumption state to the active state and acquires the current position of the vehicle specified by the global positioning system receiver, and the mobile communication apparatus includes the acquired current position in the alarm information and transmits the alarm information to the external apparatus.

5. The vehicle theft alert system according to claim 1, further comprising:

a transmitter equipped to the tire, the transmitter detecting a physical quantity related to the tire and transmitting the detected physical quantity in a wireless manner, the physical quantity being at least one of the air pressure or the acceleration of the tire; and a receiver configured to receive the physical quantity transmitted from the transmitter, the receiver including the lock state determination portion and the transmission control portion, wherein the transmitter transmits at least one of the air pressure or the acceleration to the receiver in the wireless manner in response to a change of the physical quantity, and the transmitter cancels a transmission of the physical quantity when the physical quantity maintains a same value without change.

6. The vehicle theft alert system according to claim 1, wherein:

the transmission control portion deactivates the alarm mode when the doors of the vehicle are unlocked in response to a communication between the vehicle and the external apparatus; and the transmission control portion maintains the alarm mode when the doors of the vehicle are unlocked in response to a trigger other than the communication between the vehicle and the external apparatus.

* * * * *